United States Patent
Winterton et al.

(10) Patent No.: US 6,719,929 B2
(45) Date of Patent: Apr. 13, 2004

(54) METHOD FOR MODIFYING A SURFACE

(75) Inventors: Lynn Cook Winterton, Alpharetta, GA (US); Yongxing Qiu, Duluth, GA (US); John Martin Lally, Lilburn, GA (US); Paul Clement Nicolson, Dunwoody, GA (US)

(73) Assignee: Novartis AG, Basel (CH)

( * ) Notice: Subject to any disclaimer, the term of this patent is extended or adjusted under 35 U.S.C. 154(b) by 228 days.

(21) Appl. No.: 09/774,942

(22) Filed: Jan. 31, 2001

(65) Prior Publication Data
US 2001/0045676 A1 Nov. 29, 2001

Related U.S. Application Data
(60) Provisional application No. 60/180,576, filed on Feb. 4, 2000.

(51) Int. Cl.[7] .............................................. B29D 11/00
(52) U.S. Cl. ........................ 264/1.7; 264/1.38; 264/255
(58) Field of Search ..................... 264/1.1, 1.7, 2.5, 264/255, 1.38, 1.36; 425/808

(56) References Cited

U.S. PATENT DOCUMENTS

| | | | |
|---|---|---|---|
| 4,168,112 A | 9/1979 | Ellis et al. | 351/160 |
| 4,321,261 A | 3/1982 | Ellis et al. | 424/180 |
| 4,941,997 A | 7/1990 | Decher et al. | 252/586 |
| 4,973,429 A | 11/1990 | Decher et al. | 252/587 |
| 5,068,318 A | 11/1991 | Decher et al. | 534/573 |
| 5,518,767 A | 5/1996 | Rubner et al. | 427/259 |
| 5,529,727 A | 6/1996 | LaBombard et al. | 264/1.36 |
| 5,536,573 A | 7/1996 | Rubner et al. | 428/378 |
| 6,011,082 A | 1/2000 | Wang et al. | 523/107 |
| 6,451,871 B1 * | 9/2002 | Winterton et al. | |

FOREIGN PATENT DOCUMENTS

| | | |
|---|---|---|
| EP | 0 032 443 A2 | 1/1981 |
| EP | 0 138 385 A2 | 9/1984 |
| GB | 2102070 | 1/1978 |
| JP | 1158412 | 2/1980 |
| JP | 5318118 | 3/1993 |
| WO | WO 95/00618 | 1/1995 |
| WO | WO 95/02251 | 1/1995 |
| WO | WO 95/20407 | 8/1995 |
| WO | WO 96/37241 | 4/1996 |
| WO | WO 96/18498 | 6/1996 |
| WO | WO 96/31792 | 10/1996 |

OTHER PUBLICATIONS

Blood Capatibility–Surface Characteristic Relationships of a Langmuir–Blodgett Film Composed of an Anionic Amphiphile–Polycation Complex, Uchida M., et al., New Polymers Material, vol. 4, No. 3, pp. 119–211 (1994).

Enhancement of Light Emitting Diodes Based on Self–Assembled Heterosctructures of Poly (P–phenylene vinylene), O. Onitsuka, et al., Journal Applied Physics, 80, (7), Oct. 1, 1996, pp. 4067–4071.

Investigations of New Self–Assembled Multilayer Thin Films Based on Alternately Absorbed Layers of Polyelectrolytes and Functional Dye Molecules, D. Yoo, et al., Material Resource, Soc. Symp. Proc. vol. 413, 1996, Materials Research Society.

(List continued on next page.)

*Primary Examiner*—Mathieu D. Vargot
(74) *Attorney, Agent, or Firm*—Jian S. Zhou; R. Scott Meece

(57) ABSTRACT

A method of forming a contact lens within a mold is provided. A coating of a polyionic material(s) is applied to the mold before forming a lens therein. The coating can be applied by spraying or dipping the mold within a solution(s) of polyionic materials. Various other additives can also be applied to the mold. The coating can then be transferred to a contact lens formed within the mold such that the resulting lens has altered surface properties.

51 Claims, 8 Drawing Sheets

OTHER PUBLICATIONS

New Electro–Active Self–Assembled Multilayer Thin Films Based on Alternately Absorbed Layers of Polyelectrolytes and Functional Dye Molecules, D. Yoo, et al., Elsevier Science, S.A., 1977, pp. 1425–1426.

Layer–By–Layer Modification of Surfaces Through the Use of Self–Assembled Monolayers of Polyions, D. Yoo, et al., ANTEC, 1995 pp. 2568–2570.

Molecular Self–Assembled of Conducting Polymers: A New Layer–by–Layer Think Film Deposition Process, J. H. Chung, et al.,.

Patterned Polymer Multilayer Fabrication by Controlled Adhesion of Polyelectrolytes to Plasma–Modified Fluoropolymer Surfaces, T. G. Vargo, et al, Supramolecular Science, vol. 2, Nos. 3–4, 1995, pp. 169–174.

Molecular–Level Processing of Conjugated Polymers 1. Layer–by–Layer Manipulation of Conjugated Polyions, M. Ferreira, et al., Macromolecules, vol. 28, No. 21, 1995, pp. 7107–7114.

Molecular–Level Processing of Conjugated Polymers 2. Layer–by–Layer Manipulation of In–Situ Polymerized p–type Doped Conductiong Polymers, M. Ferreira, et al., Macromolecules, vol. 28, No. 21, 1995, pp. 7115–7120.

Molecular–Level Processing of Conjugated Polymers 3. Layer–by–Layer Manipulation of of Ppolyaniline via Electrowstatic Interactions, J. H. Cheung, et al., Macromolecules, 1997, 30, pp. 2712–2716.

* cited by examiner

METHOD FOR MODIFYING A SURFACE

This application claims benefit of Provisional application Ser. No. 60/180576 filed Feb. 4, 2000.

FIELD OF THE INVENTION

The present invention generally relates to a method of treating polymeric materials, such as biomedical devices and contact lenses. In particular, the present invention is directed to a method of forming a coating onto a mold for forming a device and thereafter transferring the coating to the device as the device is formed within the mold.

BACKGROUND OF THE INVENTION

Many devices used in biomedical applications require that the bulk of the device have one property, while the surface of the device has another property. For example, contact lenses may have high oxygen permeability through the lens to maintain good corneal health. However, materials that exhibit exceptionally high oxygen permeability (e.g. polysiloxanes) are typically hydrophobic and will adhere to the eye. Thus, a contact lens generally has a core or bulk material that is highly oxygen permeable and hydrophobic, and a surface that has been treated or coated to increase hydrophilic properties, thereby allowing the lens to freely move on the eye without adhering excessive amounts of tear lipid and protein.

In order to modify the hydrophilic nature of a relatively hydrophobic contact lens material, a contact lens can be treated with a plasma treatment. For example, a high quality plasma treatment technique is disclosed in PCT Publication No. WO 96/31793 to Nicolson et al. Some plasma treatment processes, however, require a significant monetary investment in certain equipment. Moreover, plasma treatment requires that the lens be dry before exposure to the plasma.

Thus, lenses that are wet from prior hydration or extraction processes must be dried, thereby imposing added costs of obtaining drying equipment, as well as added time in the overall lens production process. As a result, a number of methods of altering the surface properties of polymeric biomaterials, such as contact lenses, have been developed. Some of these techniques include Langmuir-Blodgett deposition, controlled spin casting, chemisorption, and vapor deposition. Useful examples of Langmuir-Blodgett layer systems are disclosed in U.S. Pat. Nos. 4,941,997; 4,973,429; and 5,068,318.

A more recent technique used for coating electronic devices is a layer-by-layer ("LbL") polymer absorption process, which is described in "Investigation of New Self-Assembled Multilayer Thin Films Based on Alternately Adsorbed Layers of Polyelectrolytes and Functional Dye Molecules" by Dongsik Yoo, et al. (1996). The process described in this article involves alternatively dipping hydrophilic glass substrates in a polyelectrolyte solution (e.g., polycations such as polyallylamine or polyethyleneimine) and then in an oppositely charged dye solution to form electrically conducting thin films and light-emitting diodides (LEDs). After each dipping, the substrates are rinsed with acidic aqueous solutions. Both the dipping and rinsing solutions have a pH of 2.5 to 7. Prior to dipping, the surfaces of the glass substrates are treated in order to create a surface having an affinity for the polyelectrolyte.

Similar to the above process, two other processes are described by 1995 publications entitled "Molecular-Level Processing of Conjugated Polymers" by Fou & Rubner and Ferreira & Rubner, respectively. These processes involve treating glass substrates that have hydrophilic, hydrophobic, negatively, or positively charged surfaces. The glass surfaces are treated for extended periods in hot acid baths and peroxide/ammonia baths to produce a hydrophilic surface. Hydrophobic surfaces are produced by gas-phase treatment in the presence of 1,1,1,3,3,3-hexamethyldisilazane for 36 hours. Charged surfaces are prepared by covalently anchoring charges onto the surface of the hydrophilic slides. For example, positively charged surfaces are made by further treating the hydrophilic surfaces in methanol, methanol/toluene, and pure toluene rinses, followed by immersion in (N-2 aminoethyl-3-aminopropyl) trimethyloxysilane solution for 12 to 15 hours. This procedure produces glass slides with amine functionalities, which are positively charged at a low pH.

In addition to the above-described techniques, U.S. Pat. Nos. 5,518,767 and 5,536,573 to Rubner et al. describe methods of producing bilayers of p-type doped electrically conductive polycationic polymers and polyanions or water-soluble, non-ionic polymers on glass substrates. These patents describe extensive chemical pre-treatments of glass substrates that are similar to those described in the aforementioned articles.

The methods described above generally relate to layer-by-layer polyelectrolyte deposition. However, these methods require a complex and time-consuming pretreatment of the substrate to produce a surface having a highly charged, hydrophilic, or hydrophobic nature in order to bind the polycationic or polyanionic material to the glass substrate.

To reduce the complexity, costs, and time expended in the above-described processes, a layer-by-layer polyelectrolyte deposition technique was developed that could be effectively utilized to alter the surfaces of various materials, such as contact lenses. This technique is described in U.S. patent application Ser. No. 09/199,609 filed on Nov. 25, 1998. In particular, a layer-by-layer technique is described that involves consecutively dipping a substrate into oppositely charged polyionic materials until a coating of a desired thickness is formed. Nevertheless, although this technique provides an effective polyelectrolyte deposition technique for biomaterials, such as contact lenses, a need for further improvement still remains. For example, one way to manufacture contact lenses is to dispense a substrate into a mold, and thereafter cure the mold such that the substrate becomes polymerized and forms a contact lens. After polymerizing the substrate, it can then be removed and coated as described above. However, the substrate can often become adhered to the mold such that it is destructively torn upon removal. Moreover, it is often difficult to handle the delicate lens after it is formed such that it can be coated as described above.

As such, a need currently exists for an improved method of coating a material, such as a contact lens, with polyelectrolyte (polyionic) layers. In particular, a need exists for an improved method of forming a polyionic coated contact lens in a mold without destructively tearing the lens from the mold upon removal and for allowing the lens to be treated upon removal from the mold.

SUMMARY OF THE INVENTION

Accordingly, an object of the present invention is to provide an improved method of treating a contact lens to alter surface properties.

It is another object of the present invention to provide a method of coating a mold with polyionic materials, such as polyanionic and polycationic materials.

Still another object of the present invention to provide an improved method of forming a contact lens within a mold.

Another object of the present invention is to provide a method of coating a mold with polyionic materials and thereafter forming a contact lens within the mold such the lens becomes coated with the polyionic materials.

These and other objects of the present invention are achieved by providing a method for applying polyionic materials to a mold used in forming polymeric substrates, such as contact lenses. The method of the present invention can apply successive layers of polyionic material onto a mold using various techniques, such as spraying, multi-step dipping, or dipping in a single solution.

In accordance with the present invention, a coating can be applied to a mold used in forming contact lenses. In general, a mold can be formed by any method known in the art, such as by injection molding. Typically, two mold halves are formed and later joined together such that a cavity can form therebetween. Although it is typically desired that the mold be made from a material having at least some affinity to polyionic materials, virtually all materials known in the art for making molds can be used. For example, various types of thermoplastic material, such as UV-transmissive or UV-opaque thermoplastic materials, can be utilized to form a mold of the present invention. In one embodiment, one portion of the mold is formed from a UV transmissive material, such as polymethylacrylate, so that UV light can later pass through the section to cure a polymerizable material dispensed within the mold. In another embodiment, another portion of the mold is formed from a UV-opaque material that blocks UV light.

As stated, once a mold is formed, negatively and positively charged materials, such as polyionic materials can then be applied to the mold to form a coating thereon. In general, at least one polyanionic material and at least one polycationic is utilized, although more than one of each polyionic material can be employed.

Typically, a polycationic material of the present invention can include any material known in the art to have a plurality of positively charged groups along a polymer chain. For example, in one embodiment, the polycationic material includes poly(allyl amine hydrochloride). Likewise, a polyanionic material of the present invention can typically include any material known in the art to have a plurality of negatively charged groups along a polymer chain. For example, in one embodiment, the polyanionic material includes polyacrylic acid.

In addition to polyionic materials, various other materials and/or additives can be applied to a mold of the present invention before forming a contact lens therein. Some examples of suitable additives include, but are not limited to, antimicrobials, antibacterials, visibility tinting agents, iris color modifying dyes, ultraviolet light tinting dyes, cell growth inhibitors, etc.

According to the present invention, polyionic materials and/or other additives can be applied to a mold using any technique known in the art for applying a coating to a material. For example, the polyionic materials can be spray coated onto the mold using one or a series of spray coating techniques. One such spray coating technique that can be used in the present invention is described in U.S. Pat. No. 5,582,348 to Erickson et al., which is incorporated herein by reference. This particular spray technique involves the atomization of a liquid by ultrasonic vibrations such that a spray can form therefrom. It should be understood, however, that any other spray coating technique known in the art can also be used in the present invention.

In addition to spray coating, dipping techniques can also be used to apply polyionic materials and/or other additives to a mold. One dipping technique that can generally be used in the present invention is multi-step dipping process, such as described in U.S. patent application Ser. No. 09/199,609, which is incorporated herein in its entirety by reference thereto. In particular, multi-step dipping processes involve the consecutive application of oppositely charged polyionic materials onto a material. Besides multi-step dipping, a single-dip process, such as described in U.S. patent application (filed on the same day as the present application) entitled "Single-Dip Process for Achieving a LbL-Like Coating" can also be used in the present invention to apply a polyionic coating onto a mold. In some embodiments, combinations of the above mentioned coating techniques, as well as other well known coating techniques, can be used.

Moreover, in one embodiment, the mold can be "preconditioned" to enhance the ability of the polyionic solution to coat the mold. For example, a standard layer-by-layer process can be used to form an underlayer or primer coating on the substrate. This underlayer can sufficiently "roughen" the surface such that the ultimate polyionic solution of the present invention can better adhere to the mold surface.

Once a mold is sufficiently coated in accordance with the present invention, a substrate material can then be dispensed into a cavity formed by the connection of the mold halves. In general, a substrate material of the present invention can be made from any polymerizable material. In particular, a substrate material of the present invention can be made from oxygen-permeable materials. For example, some examples of suitable substrate materials include, but are not limited to, the polymeric materials disclosed in U.S. Pat. No. 5,760,100 to Nicolson et al., which is incorporated herein by reference.

After the substrate material has been dispensed within the mold, it can then be cured using processes well known in the art. Curing the substrate material within the mold causes the material to become polymerized. Morever, the polyionic materials applied to the mold become detached during curing and reattach to the polymerized contact lens. As such, by coating a mold according to the present invention, the coating can be transferred onto the contact lens formed therein. The coated contact lens can thereafter be easily removed from the mold without destructively tearing. Moreover, further substantial handling of the contact lens is not required.

In some embodiments, however, it may be desired to apply secondary coatings of polyionic materials and/or other additives to the contact lens after it is formed. As such, any of the coating techniques discussed above can be utilized to further coat the contact lens. Moreover, in some embodiments, the formed contact lens can be "preconditioned" before applying such secondary coatings.

As described above, one method for "preconditioning" a contact lens is by the application of a primer layer or underlayer of coating. In addition, a solvent solution comprising a solvent and at least one polyionic material can also be applied to the contact lens for preconditioning. The application of a solvent, such as an alcohol solution, can allow the lens to swell. After swelling, the lens can then be removed from the solvent solution such that it shrinks. The shrinking of the lens can entrap the polyionic component(s) within the lens. As a result, in some embodiments, the ultimate polyionic solution can be more easily adhered to the lens surface when applied thereto.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
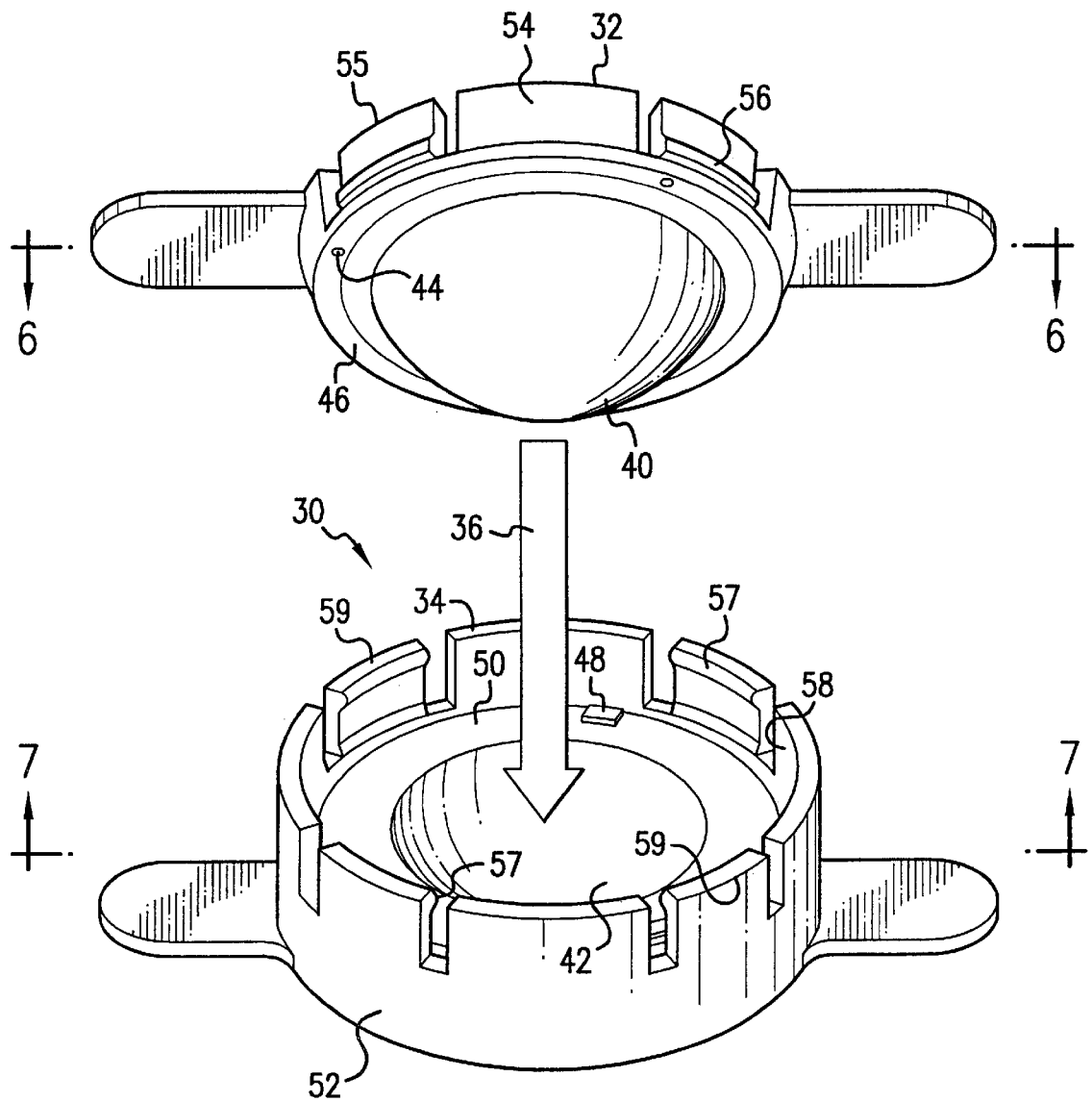
FIG. 1 is a perspective view of a contact lens mold according to an embodiment of the present invention.

Repeat use of reference characters in the present specification and drawings is intended to represent same or analogous features or elements of the invention.

DETAILED DESCRIPTION OF REPRESENTATIVE EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

In general, the present invention is directed to an improved method of forming polymeric materials, such as contact lenses, and coating such materials with polyionics. In particular, the present invention is directed to a process for applying polyionic materials to a mold using various techniques and thereafter forming a contact lens within the mold such that the lens becomes coated with the polyionic materials. It has been discovered that a process of the present invention can be utilized to form a contact lens within a mold without destructively tearing the lens upon removal. When a lens is formed within a mold, it often adheres to the mold upon its removal. Although, some types of adherence may be desirable, such as in automated inspection, other types of adherence can cause the lens to tear or rip upon removal. It has been discovered that a process of the present invention substantially inhibits such destructive adherence.

Moreover, a lens formed according to the present invention can also be sufficiently coated with a certain thickness of polyionic coating such that the hydrophilic or hydrophobic nature of the lens surface is altered. It has been discovered that a process of the present invention can alter the surface properties of contact lenses in a manner comparable to prior techniques, such as plasma treating. However, by applying polyionic materials to a mold prior to forming a contact lens in accordance with the present invention, various other processing advantages can result, such as eliminating the sometimes delicate handling of a contact lens after its formation.

In this regard, one embodiment of a process of the present invention generally includes the steps of forming mold sections, applying a coating of polyionic material to the mold sections, depositing a curable mixture of polymerizable materials in a cavity formed by the mold sections, curing the mixture, and disassembling the mold assembly such that the formed lens can be removed therefrom. Although contact lenses are specifically discussed herein, it should be understood that any other device, such as medical devices, that can be formed by cast molding can have a coating applied utilizing a process of the present invention. Moreover, it should also be understood that other processes are equally suitable for use in the present invention and that the following description is an exemplary embodiment of one such process.

Formation of the Mold

Methods of manufacturing mold sections for cast molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold that can be coated in accordance with the present invention.

In general, a mold can be formed from two mold halves, i.e. front and back mold halves, which themselves can be formed through various techniques, such as injection molding. These half sections can later be joined together such that a cavity forms therebetween. Thereafter, a contact lens can be formed within the cavity of the mold sections using various processing techniques, such as ultraviolet curing.

One embodiment of a method for producing mold halves of the present invention is described and discussed below. Other examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Figure 6A:
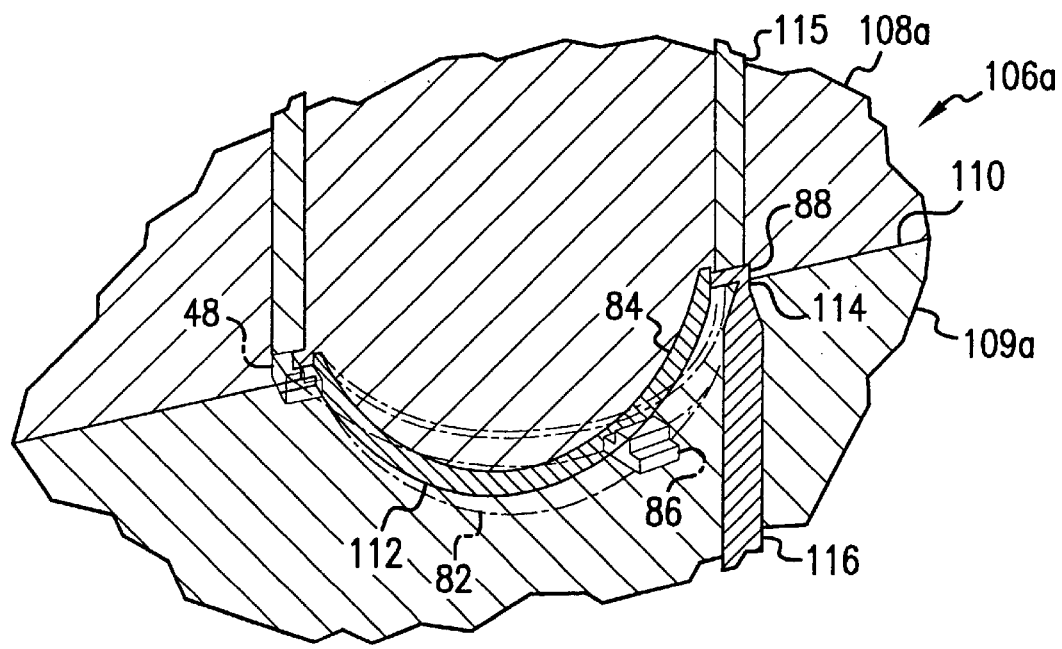
FIG. 6A is a cross-sectional illustration of a mold for making a first section of the front curve mold half as shown in FIG. 1 according to an embodiment of the method according to the present invention.
Figure 6B:
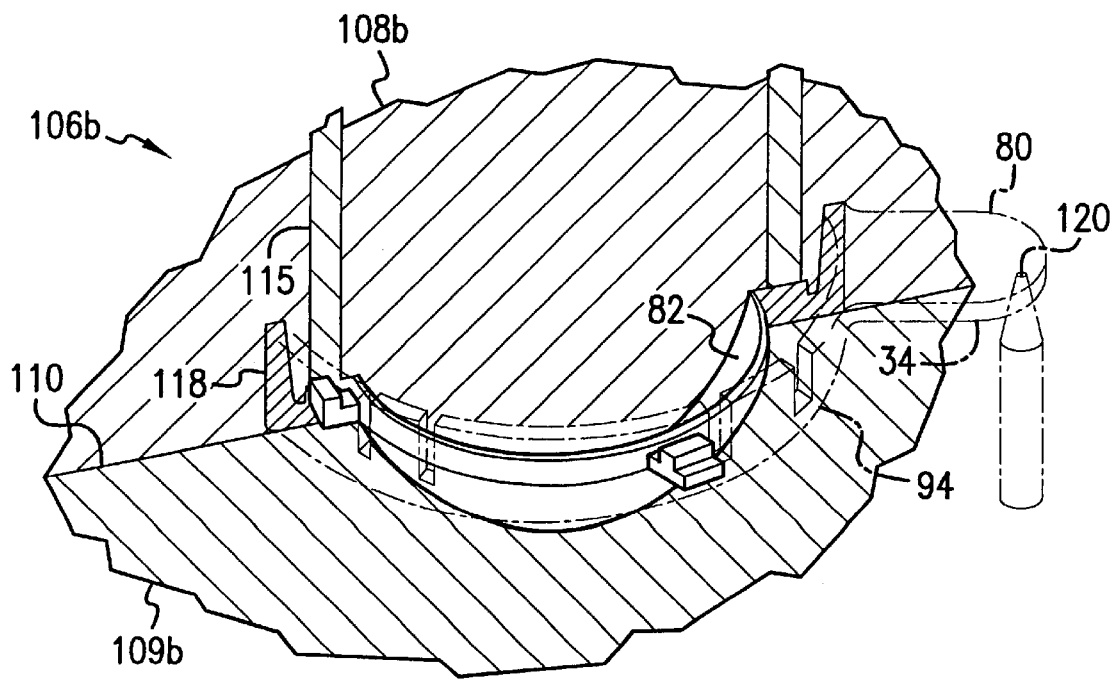
FIG. 6B is a cross-sectional illustration of a mold for forming a second section of the front curve mold half as shown in FIG. 1.

Referring to FIGS. 6A and 6B, a method of forming front and back mold halves is illustrated. Specifically, FIGS. 6A and 6B illustrate a first method of injection molding front curve mold half 34. A similar process is used for molding the back curve mold half and is therefore not discussed in detail herein. An injection molding machine 106a and 106b is, for purposes of clarity, indicated by first mold sections 108a and 108b and second mold sections 109a and 109b that are reciprocally movable to and away from their respective first mold sections. Injection molding machines are familiar to those skilled in this art and are therefore not discussed in greater detail herein. Accordingly, while first mold sections 108a and 108b and second mold sections 109a and 109b are illustrated as continuous blocks, it should be understood that they may comprise any suitable configuration and components, including cavity blocks, inserts and cooling passages, as appropriate, and as should be understood by those skilled in this art.

FIG. 6A illustrates first mold 106a in which first mold section 108a meets second mold section 109a at a parting line 110 to form a mold cavity 112 therebetween. Mold cavity 112 is shaped to form first section 82 of mold half 34. A cross-section of the molded mold half is indicated by cross hatching. The part of first section 82 extending forward out of the plane of the cross-section is indicated in phantom.

Thermoplastic material, such as molten UV-transmissive or UV-opaque thermoplastic material, is injected into mold cavity 112 through gate 114 of a cold runner 116 indicated schematically at 116. Cold runner could be replaced by a hot runner system, for example a valve-gated or hot tip system. Thermoplastic material solidifying between the injection gate and center section 84 forms gate 88.

Once the thermoplastic material in cavity 112 has cooled, mold sections 108a and 109a are separated at parting line 110, and the first section 82 is removed from the core side to which it sticks by suitable ejection means, for example ejector pins pushing outward against tabs 86 or protrusions 48. Once removed from mold 106a, first section 82 is placed in a mold cavity 118 of a second mold 106b including reciprocally movable mold sections 108b and 109b. Mold cavity 118 extends radially outward from first section 82 to define second section 94 of mold half 34. Thermoplastic material, such as molten UV-transmissive or UV-opaque thermoplastic material is injected through a gate 120 into mold cavity 118 to form second section 94 to complete mold half 34. The part of second section 94 in the cross-sectional plane of FIG. 9B is indicated by cross hatching, and the part of second section 94 extending forward of the cross-section is indicated in phantom.

Figure 8:
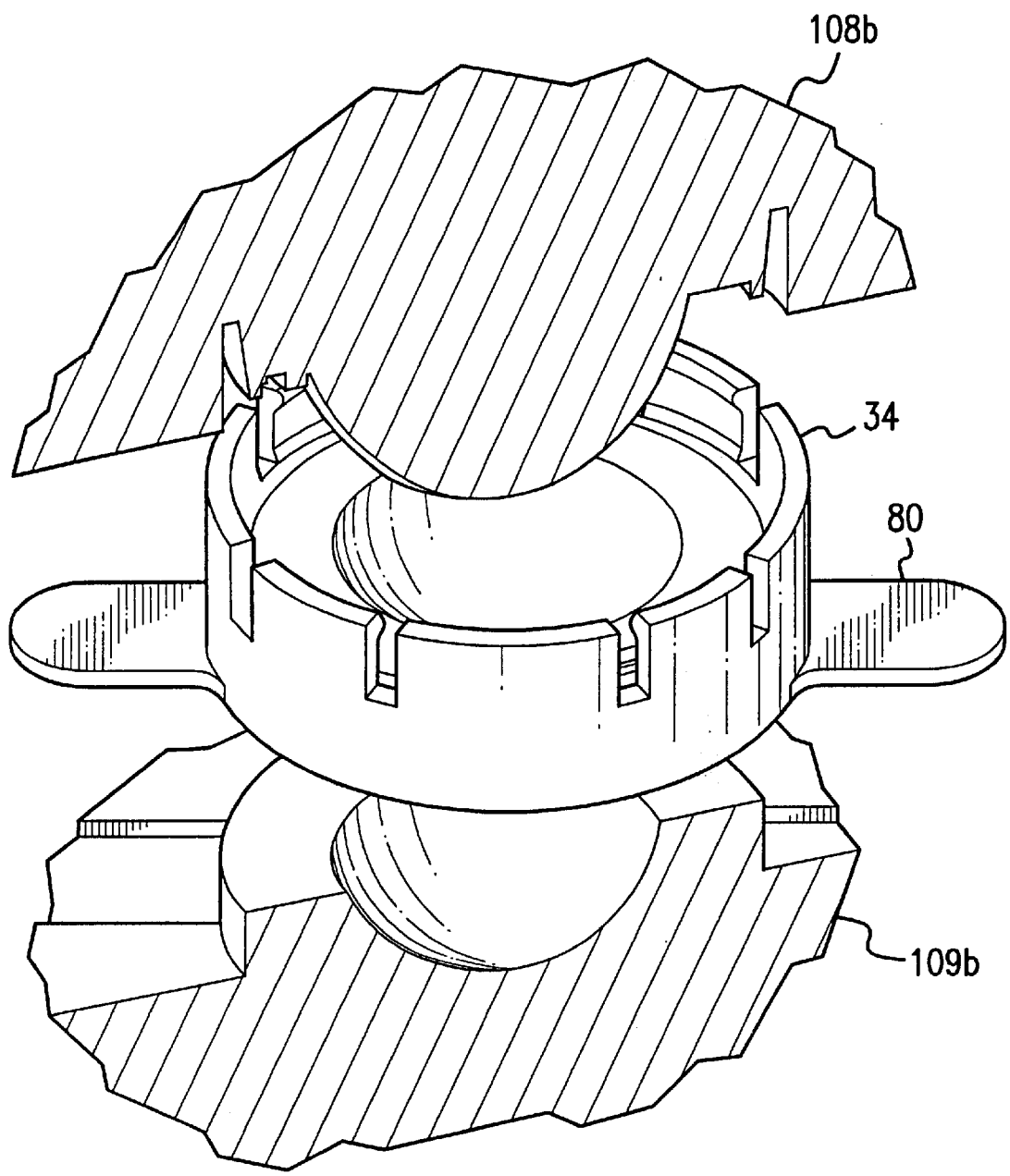
FIG. 8 is an exploded view of the mold and mold half as in FIG. 7B.

The material used to form second section 94 typically has a melt temperature lower than that of the material used to make first section 82, and the material injected into cavity 118 is typically at a lower temperature than the melt temperature of the material of first section 82, so that first section 82 does not melt during the molding of second section 94. Once second section 94 has cooled, first mold section 108b and second mold section 109b are separated, and mold half 34 is removed from mold 106b by suitable ejection means, for example including ejector pins bearing on tabs 80. An exploded view of the mold 106b and mold half 34 is provided in FIG. 8.

Referring to FIGS. 3, 7A, 7B and 7C, mold half 34 may be formed in a single mold using a two-shot technique. Mold 106 includes a first mold section 108 and a second mold section 109 that meet in a first configuration at a parting line 110 to form a mold cavity 112 shaped to define first section 82 of mold half 34. In one embodiment, molten UV-transmissive thermoplastic material is injected into cavity 112 through an injection gate 121 of a cold runner system, indicated at 123, radially offset from the center section of first section 82. As with the molds illustrated in FIGS. 6A and 6B, cold runner 123 may be replaced by a suitable hot-runner system.

Figure 7A:
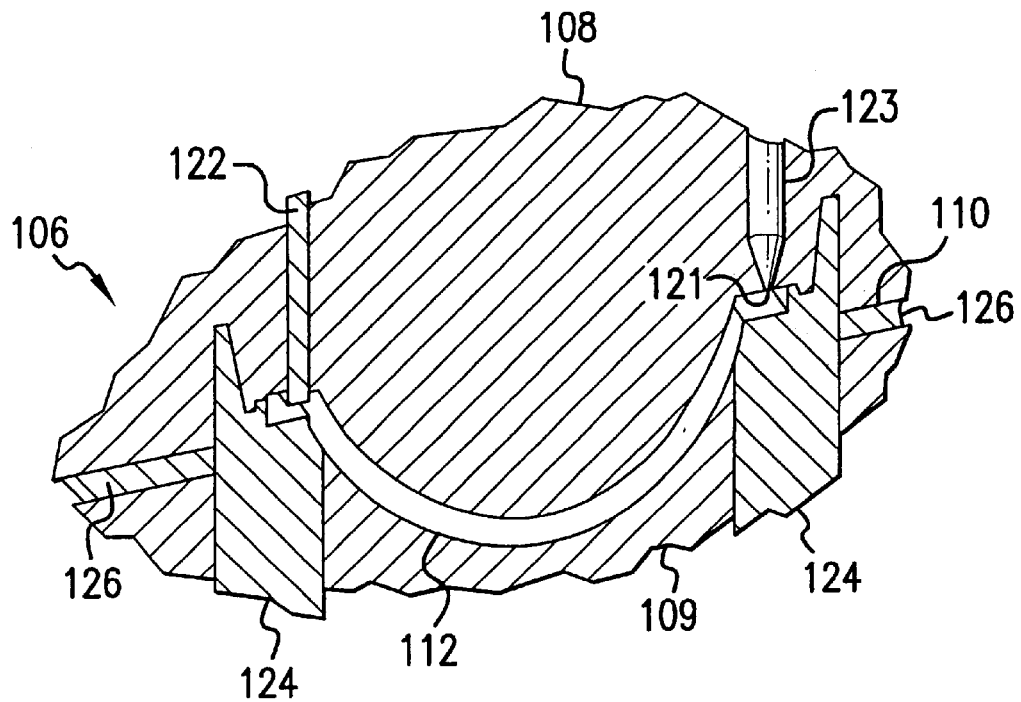
FIG. 7A is a cross-sectional illustration of a mold for making a front curve mold half according to an embodiment of the method according to the present invention.
Figure 7B:
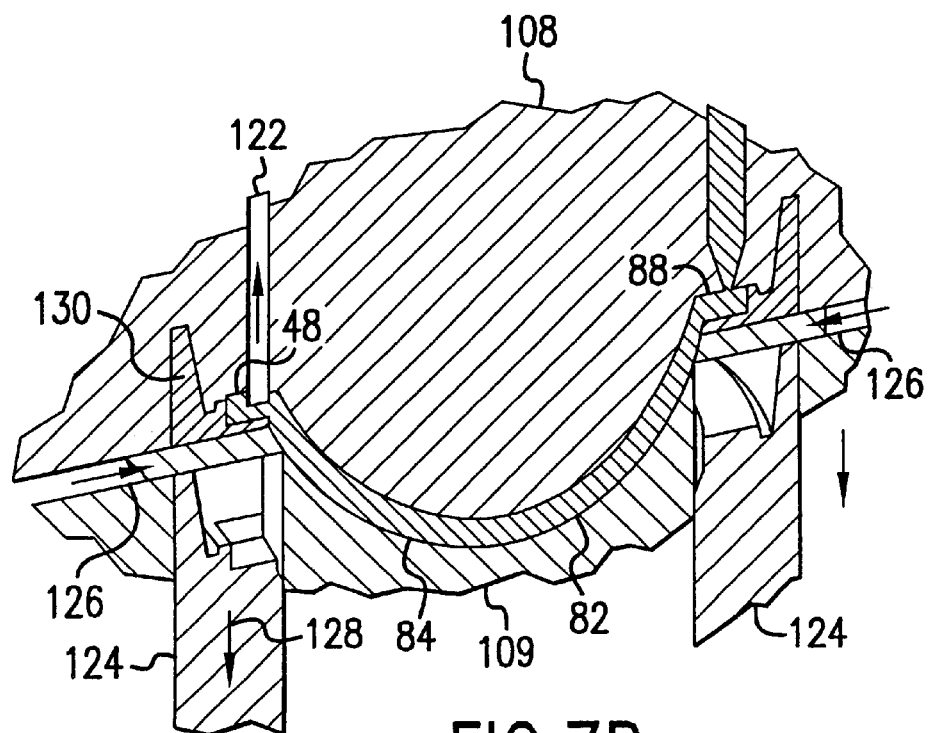
FIG. 7B is a cross-sectional illustration of the mold as in FIG. 7A.

Mold section 108 includes three reciprocal sections 122 (one of which is shown in FIGS. 7A and 7B), each extending into the gap between a protrusion 48 and the center section 84 above one of the tabs 86. Each section 122 extends slightly laterally beyond its respective tab 86 on one or both sides. Second mold section 109 includes an axially movable section 124 and four radially movable sections 126 (two of which are shown in FIGS. 7A and 7B).

Figure 3:
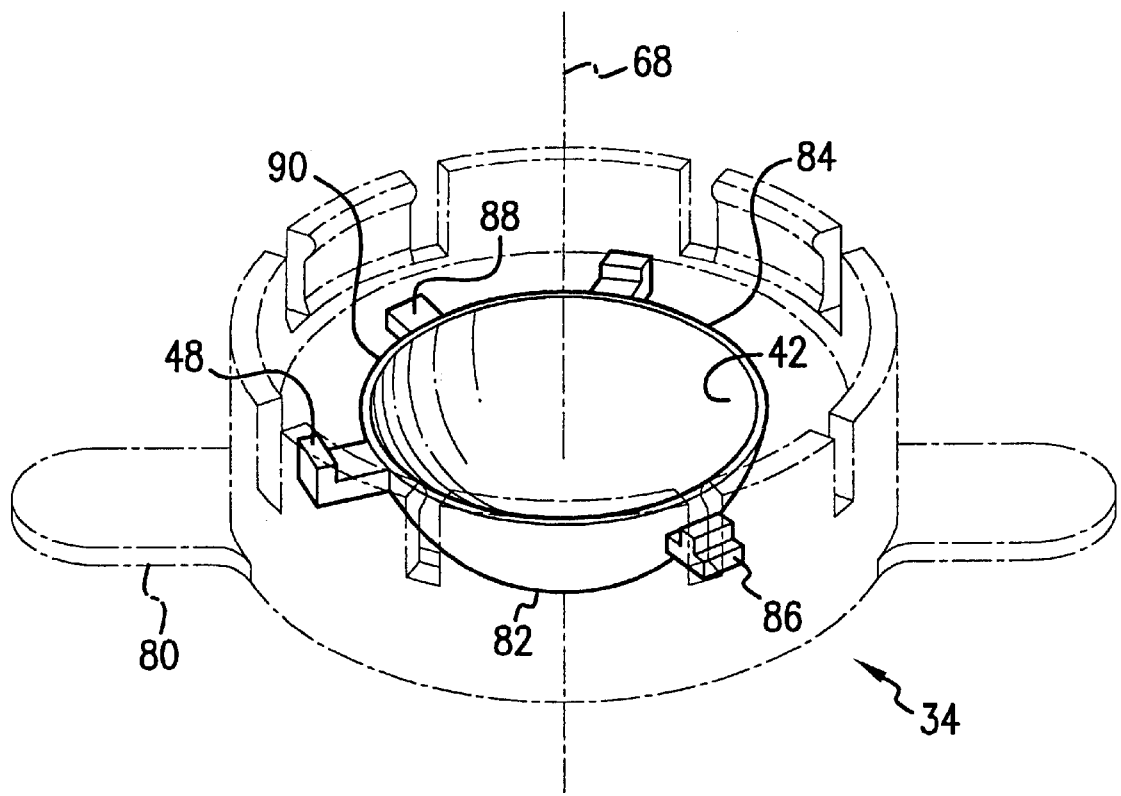
FIG. 3 is a partial perspective view of a front curve mold half as shown in FIG. 1.
Figure 5:
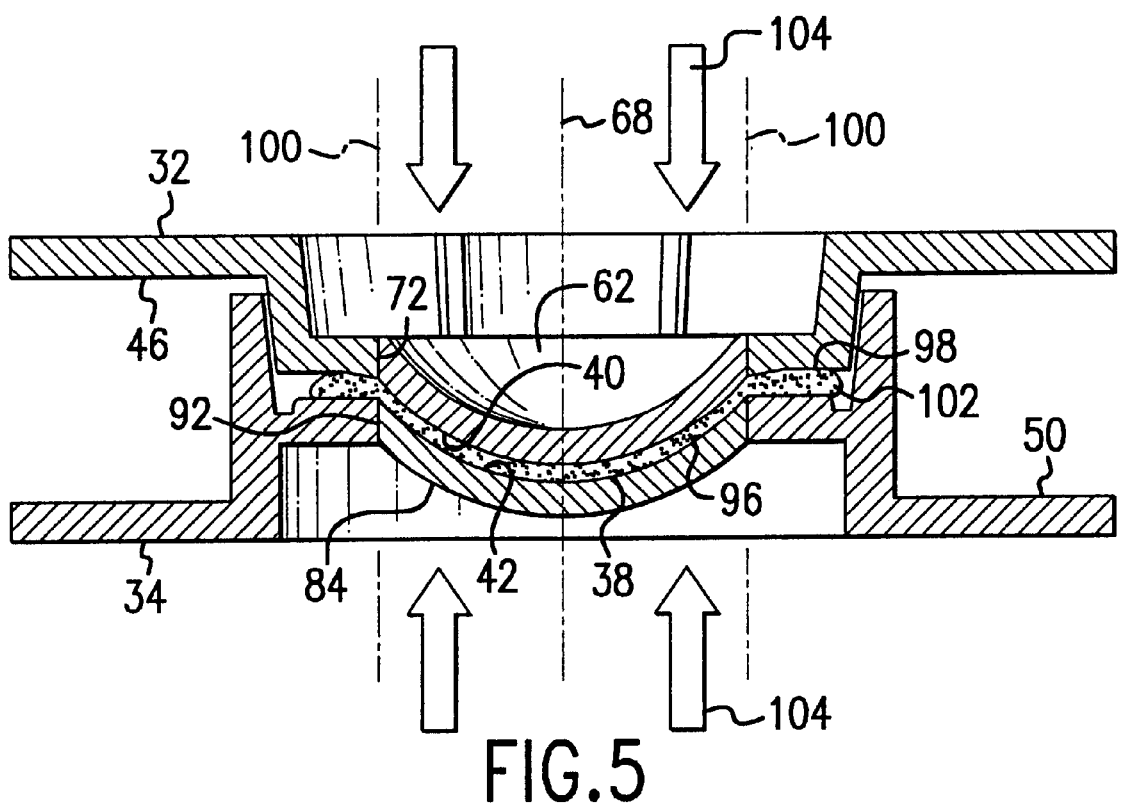
FIG. 5 is a cross-sectional view of the mold as in FIG. 3 operatively engaged.

Referring specifically to FIG. 6B, when first section 82 cools, the three axially movable sections 122 are raised until their bottom surfaces become flush with the boundary of front sides 50 of mold half 34 (FIG. 1). Axially movable portion 124 of mold section 109 drops, as indicated by arrows 128, to open a cavity 130 shaped to define collar 52 (FIG. 1) and the portion of second section 82 extending from the collar to central section 84. Radially movable sections 126 are inwardly moved to define the back side of this cavity. Although not shown in FIG. 7B, mold section 108 includes cavities that open into cavity 130 when movable portion 124 drops to define the tabs 80 (FIGS. 3 and 5). One of the tabs 80 is shown in phantom in FIG. 6C.

Figure 7C:
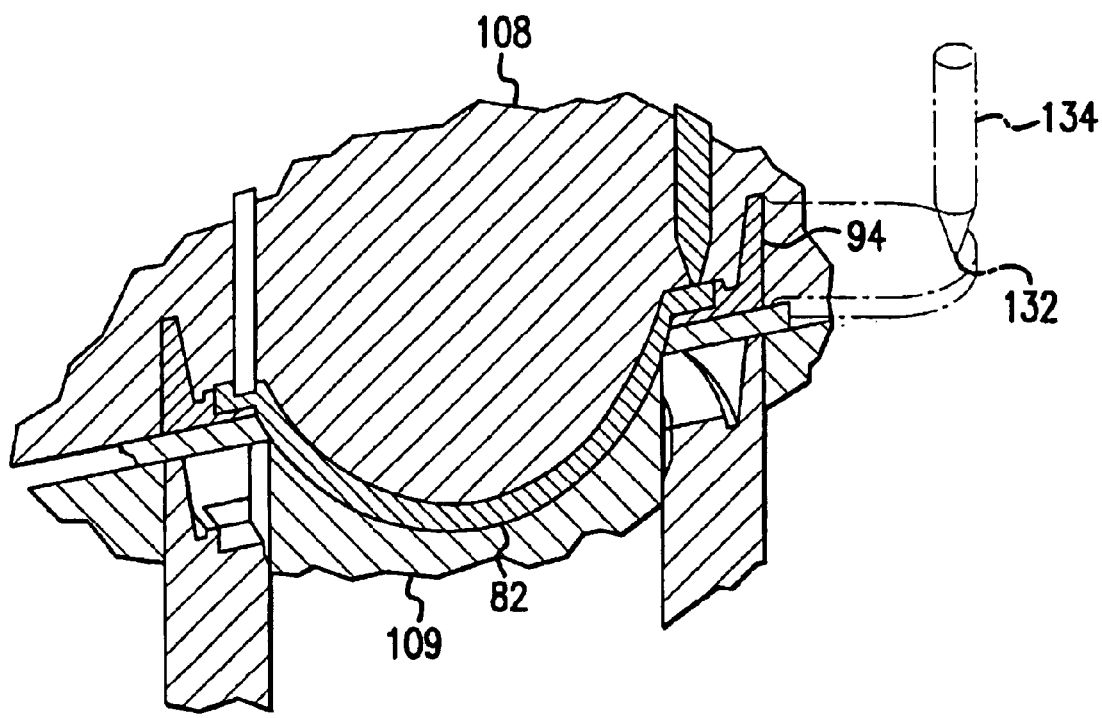
FIG. 7C is a cross-sectional illustration of the mold half as in FIG. 7A.

Accordingly, referring to FIG. 7C, the modified mold sections 108 and 109 define second section 94 radially outward of first section 82. In one embodiment, molten UV-opaque thermoplastic material is injected into this cavity through an injection gate 132 opening from a sprue 134 into one of the tabs 80 until the cavity 130 is filled. Once the second section has cooled, first mold section 108 and second mold section 109 are separated, and the molded mold half is removed by suitable ejection means.

Referring again to the illustrated embodiment, first sections 62 and 84 are typically formed by a thermoplastic material. Although it is normally desired that the thermoplastic material used to form the mold have somewhat of an affinity to polyionic materials, most available mold materials can be used in accordance with the present invention. For example, polyolefin materials, such as polyethylene can be used. UV-transmissive and/or UV-opaque materials can also be used. One such material that passes ultraviolet light is, for instance, polymethylmethacrylate (PMMA). In one embodiment, the first sections are made from HITACHI OPTOREZ, a birefringent-free PMMA available from Hitachi Chemical Company. Second sections 76 and 94, however, can, in some embodiments, be formed from a UV-opaque material such as PMMA mixed with a pigment (e.g. carbon black) or a UV absorber or reflector. One UV-opaque material may comprise an impact modified acrylic including PMMA and butadiene or other rubber-like compound. In one preferred embodiment, the second sections are made from LUCITE SUPERTUF ST5068, an impact modified acrylic available from E. I. du Pont de Nemours and Company, mixed with carbon black pigment.

As stated, the second sections can be UV-opaque in that they block passage of ultraviolet light, whether by absorption or reflection. Exemplary ultraviolet blockers that may be used within the present invention include screening agents, UV absorbers and excited state quenchers. UV screens are typically pigments, (such as carbon black) that absorb UV light, often absorb visible light, and transform the energy into infrared radiation. UV absorbers absorb UV light but absorb little, if any, visible light. They typically dispose of absorbed energy though heat or chemical changes. Excited-state quenchers convert energy produced by a reaction with photoexcited polymer molecules to infrared radiation.

Any suitable UV blocker may be used within the present invention. Exemplary UV absorbers include benzophenone, salicylate and benzotriazole. Commercially available benzotriazole absorbers include TINUVIN P, TINUVIN 326 and TINUVIN 1130, available from Novartis Corp., and ADK STAB LA 31, available from Asahi Denka. Derivatives of 2-hydroxy-benzophenone and hydroxybenzotriazole, as well as phenylsalicylates, cyanoacrylates, O-hydroxyphenyl benzoltriazoles, resorcinol monobenzoate, phenol/resorcinol esters of tere- or isophthalic acids, may also be used. Suitable UV absorbers may include radical scavengers such as hindered phenols and piperidine derivatives. Excited-state quenchers include hindered amines and salts or chelates of cobalt, nickel or zinc.

Coating Processes and Materials

A. Coating Materials

Various negatively charged and/or positively charged materials, such as polyionic materials, can be added to a mold in accordance with the present invention. By adding polyionic materials to the mold itself, a contact lens later formed within the mold can be coated with the polyionic materials and easily removed from the mold without destructively tearing.

As used herein, a "polyion" or "polyionic material" refers to a polymeric material that has a plurality of charged groups, such as polyelectrolytes, p- and n-type doped conducting polymers. Polyionic materials include both polycations (having positive charges) and polyanions (having negative charges). Some examples of polyionic materials that are suitable for use in the present invention are disclosed in U.S. patent application Ser. No. 09/199,609 and discussed below.

Accordingly, a polycationic material used in the present invention can generally include any material known in the art to have a plurality of positively charged groups along a polymer chain. For instance, suitable examples of such polycationic materials can include, but are not limited to:

(a) poly(allylamine hydrochloride) (PAH)

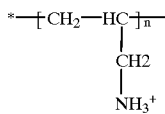

(b) poly(ethyleneimine) (PEI)

(c) poly(vinylbenzyltriamethylamine) (PVBT)

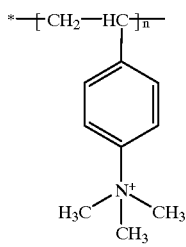

(1d) polyaniline (PAN or PANI) (p-type doped) [or sulphonated polyaniline]

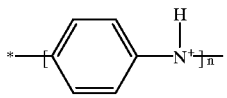

(1e) polypyrrole (PPY) (p-typed doped)

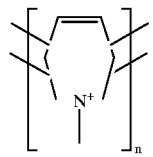

(1f) poly(pyridinium acetylene)

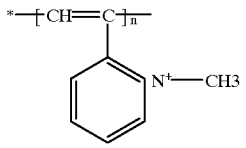

In addition, a polyanionic material used in the present invention can generally include any material known in the art to have a plurality of negatively charged groups along a polymer chain. For example, suitable polyanionic materials can include, but are not limited to:

(a) polymethacrylic acid (PMA)

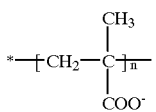

(b) polyacrylic acid (PAA)

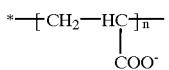

(c) poly(thiophene-3-acetic acid) (PTAA)

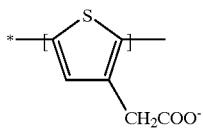

(d) poly(4-styrenesulfonic acid) (PSS) or sodium poly(styrene sulfonate) (SPS) or poly(sodium styrene sulfonate) (PSSS)

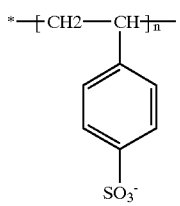

In certain embodiments, either the polyanionic or polycationic material can be made from derivatives of a polyallyl amine having a weight average molecular weight of at least 2000 that, based on the number of amino groups of the polyallyl amine, comprises from approximately 1 to 99% of units having the following formula (1):

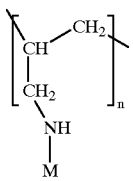

wherein M is a "modifier unit". For instance, in one embodiment, the modifier unit, M, can be R—C=O, where R is $C_2$–$C_6$ alkyl that is substituted by two or more same or different substituents selected from the group consisting of hydroxy, $C_2$–$C_5$ alkanoyloxy, and $C_2$–$C_5$ alkylamino carbonyloxy. Preferably, R is linear $C_3$–$C_6$ alkyl, more preferably linear $C_4$–$C_5$ alkyl, and most preferably n-pentyl that is in each case substituted as defined above.

Suitable substituents of the alkyl radical R are —OH, a radical —O—C(O)—$R_1$, and/or a radical —O—C(O)—NH—$R_1'$, wherein $R_1$ and $R_1'$ are each independently of the other $C_1$–$C_4$ alkyl, preferably methyl, ethyl, iso-, or n-propyl, and more preferably methyl or ethyl. Preferred substituents of the alkyl radical R are hydroxy, acetyloxy, propionyloxy, iso- or n-butanoyloxy, methylaminocarbonyloxy or ethylaminocarbonyloxy, especially hydroxy, acetyloxy, or propionyloxy, and in particular hydroxy.

A particular embodiment of the present invention relates to units of formula (3), wherein R is linear $C_p$-alkyl comprising "p" same or different above-mentioned substituents, and wherein p is 2, 3, 4, 5, or 6, and preferably 4 or 5, and more preferably 5. Alternatively, R may be $C_p$-alkyl comprising "p" hydroxy groups that may be partly or completely acetylated, wherein p is 4 or 5, and preferably 6. Particular preferred radicals R are 1,2,3,4,5-pentahydroxy-n-pentyl or 1,2,3,4,5-pentahydroxy-n-pentyl, wherein the hydroxy groups are partly or completely acetylated.

As stated above, embodiments of a polyionic material of the present invention include derivatives of a polyallyl amine that, based on the number of amino groups of the polyallyl amine, comprise from about 1 to about 99%, in some embodiments from about 10 to about 80%, in some embodiments from about 15 to about 75%, and in some embodiments from about 40 to about 60%, of units of formula (1). In general, polyionic materials of the present invention are also water-soluble.

A particular group of polyallyl amine polymers useful in the present invention comprise at least 1%, in some cases, at least 5%, and in other cases, at least 10% of units of PAH, based on the number of amino groups of the polyallyl amine. Moreover, one group of polyallyl amine polymers may have a weight average molecular weight of, for example, from 2,000 to 1,000,000, from 3,000 to 500,000, from 5,000 to 150,000, or more particularly from 7,500 to 100,000.

The polyallyl amine polymers described above may be prepared by any manner known in the art. For example, a polyallyl amine having a weight average molecular weight of at least 2,000 that comprises units of PAH, may be reacted with a lactone having the following formula (6):

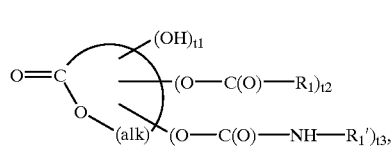

wherein (alk) is linear or branched $C_2$–$C_6$-alkylene, the sum of (t1–t2–t3) is at least 1, and $R_1$ and $R_1'$, as defined, to yield a polyallyl amine polymer comprising units of formula (1) and PAH.

The reaction between the polyallyl amine and the lactone may be performed in any manner known in the art, such as, by reacting the polyallyl amine with the lactone in an aqueous medium at a temperature from about 20° C. to about 100° C., and in some cases from about 30° C. to about 60° C. The ratio of units of formula (1) and PAH in the final polymer is determined by the stoichiometry of the reactants. The lactones of formula (6) are known or may be prepared according to known methods. Compounds of formula (6), wherein t2 or t3 $\geq$ 1 are, for example, available by reacting the respective hydroxy compound of formula (6) with a compound $R_1$—C(O)X or $R_1'$—NCO under conditions well known in the art. Polyallyl amine starting materials of different molecular weights are commercially available, e.g. in the form of the hydrochloride. Hydrochloride can be converted previously into the free amine, for example, by a treatment with a base, such as sodium or potassium hydroxide solution.

Polyallyl amines comprising additional "modifier units" may be prepared by adding to the reaction a mixture of the polyallyl amine and the compound of formula (6), simultaneously or preferably successively. Some examples of compounds that can be added to a polyallyl amine and the compound of formula (6) include, but are not limited to, the following:

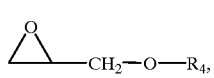 (6f)

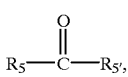 (6g)

 (6h)

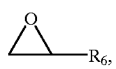 (6i)

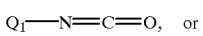 (6j)

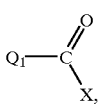 (6k)

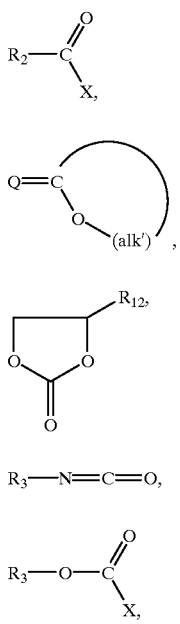

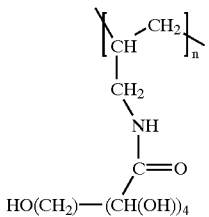

wherein X is halogen, preferably chlorine; (alk') is $C_1$–$C_{12}$-alkylene; $R_{12}$ is hydrogen or $C_1$–$C_2$-alkyl, preferably hydrogen or methyl; and $R_3$, $R_4$, $R_5'$, $R_6$ and $Q_1$ are as defined above. The reaction proceeds, for example, in an aqueous solution at room temperature or at an elevated temperature, such as from about 25° C. to about 60° C., and yields various polymers comprising various modifier units.

Because the reaction of the amino groups of the polyallyl amine with the compounds of formulae (6) or (6a)–(6k) proceeds, in general, quantitatively, the structure of the modified polymers is determined mainly by the stoichiometry of the reactants that are employed into the reaction. A particular polyionic material is polyallylamine gluconolactone, as shown below in formula (7):

The polyallyl amine may be one in which about 20% to about 80% of the amino groups have been reacted with delta-glucolactone to yield R groups of formula (7).

In order to alter various characteristics of the coating, such as thickness, the molecular weight of the polyionic materials can be varied. In particular, as the molecular weight is increased, the coating thickness generally increases. However, if the increase in molecular weight increase is too substantial, the difficulty in handling may also increase. As such, polyionic materials used in a process of the present invention will typically have a molecular weight $M_n$ of about 10,000 to about 150,000. In some embodiments, the molecular weight is about 25,000 to about 100,000, and in other embodiments, from about 75,000 to about 100,000.

In accordance with the present invention, polyionic solutions of the present invention, as described above, can be prepared in a variety of ways. In particular, a polyionic solution of the present invention can be formed by dissolving the polyionic material(s) in water or any other solvent capable of dissolving the materials. When a solvent is used, any solvent that can allow the components within the solution to remain stable in water is suitable. For example, an alcohol-based solvent can be used. Suitable alcohols can include, but are not limited to, isopropyl alcohol, hexanol, ethanol, etc. It should be understood that other solvents commonly used in the art can also be suitably used in the present invention.

Whether dissolved in water or in a solvent, the concentration of a polyionic material in a solution of the present invention can generally vary depending on the particular materials being utilized, the desired coating thickness, and a number of other factors. However, it may be typical to formulate a relatively dilute aqueous solution of polyionic material. For example, a polyionic material concentration can be between about 0.001% to about 0.25% by weight, between about 0.005% to about 0.10% by weight, or between about 0.01% to about 0.05% by weight.

In general, the polyionic solutions mentioned above can be prepared by any method well known in the art for preparing solutions. For example, in one embodiment, a polyanionic solution can be prepared by dissolving a suitable amount of the polyanionic material, such as polyacrylic acid having a molecular weight of about 90,000, in water such that a solution having a certain concentration is formed. In one embodiment, the resulting solution is a 0.001M PAA solution. Once dissolved, the pH of the polyanionic solution can also be adjusted by adding a basic or acidic material. In the embodiment above, for example, a suitable amount of 1N hydrochloric acid (HCl) can be added to adjust the pH to 2.5.

Polycationic solutions can also be formed in a manner as described above. For example, in one embodiment, poly(allylamine hydrochloride) having a molecular weight of about 50,000 to about 65,000 can be dissolved in water to form a 0.001M PAH solution. Thereafter, the pH can also be adjusted to 2.5 by adding a suitable amount of hydrochloric acid.

In some embodiments of the present invention, it may be desirable to apply a solution containing both polyanionic and polycationic materials within a single solution. In such an instance, such a solution can be formed according to U.S. patent application (filed on the same day as the present application) entitled "Single-Dip Process for Achieving a LbL-Like Coating", which is incorporated herein by reference. For example, a polyanionic solution can be formed as described above, and then mixed with a polycationic solution that is also formed as described above. In one embodiment, the solutions can then be mixed slowly to form the coating solution. The amount of each solution applied to the mix depends on the molar charge ratio desired. For example, if a 10:1 (polyanion:polycation) solution is desired, 1 part (by volume) of the PAH solution can be mixed into 10 parts of the PAA solution. After mixing, the solution can also be filtered if desired.

In addition to polyionic materials, other additives can also be applied to a mold for forming a contact lens in accordance with the present invention. As used herein, an additive can generally include any chemical or material. For example, active agents, such as antimicrobials and/or antibacterials can be applied, particularly when used in biomedical applications. Some suitable antimicrobial materials include polyquaternary ammonium compounds, such as those described in U.S. Pat. No. 3,931,319 to Green et al. (e.g.

"POLYQUAD"), which is incorporated herein by reference. Other antimicrobial or antibacterials that can be utilized in the present invention are peptides, other polyquats, mucin, mucin mimics, glycopeptides, glycoproteins, silk proteins, cellulose, dextran or other anti-microbial or anti-bacterial entities. Still other examples of such anti-bacterials or antmicrobials are disclosed in U.S. Pat. No. 5,866,113 to Hendriks et al., and U.S. Pat. No. 5,891,506 to Keogh, which are incorporated herein by reference.

Moreover, others examples of additives that can be applied according to the present invention are various materials useful for ophthalmic lenses, such as materials having radiation absorbing properties. Such materials can include, for example, visibility tinting agents, iris color modifying dyes, and ultraviolet (UV) light tinting dyes. Still another example of a material that can be utilized in the present invention is a polyionic material that inhibits or induces cell growth. Cell-growth inhibitors can be useful in devices that are exposed to human tissue for an extended time with an ultimate intention to remove (e.g. catheters), while cell-growth inducing polyionic materials can be useful in permanent implant devices (e.g. artificial cornea).

B. Coating Processes

In accordance with the present invention, a coating process is provided that can be utilized to coat a contact lens with polyionic materials and/or other additives when forming a lens within a mold. Various techniques for applying polyionic materials and/or other additives to a mold prior to forming a contact lens within the mold will now be described. It should be understood, however, that many techniques not described in detail below can be used in the present invention and that the following description is for exemplary purposes only. In particular, any technique known in the art for applying a coating to a mold can be used with the present invention.

In one embodiment of the present invention, the polyionic materials can be applied to a contact lens mold using one or a series of spray coating techniques. For example, the spraying process generally includes the steps of spraying a first polyionic material to a mold by contacting the mold with a first solution of a first polyionic material, rinsing the mold with a rinsing solution, and optionally drying the mold. Similarly, the spray-coating process above may then be repeated with one or more polyionic materials. In one embodiment of such a spray-coating process, a mold is sprayed with a polyanionic solution (PAA), rinsed with water, dipped in a polycationic solution (PEI), rinsed with water, dipped in a polyanionic solution (PAA), etc., until the desired coating thickness is applied to the mold.

Spray coating application can be accomplished via a number of methods known in the art. For example, a conventional spray coating arrangement may be used, i.e. the liquid material is sprayed by application of fluid, which may or may not be at an elevated pressure, through a reduced diameter nozzle that is directed towards the deposition target. Another spray coating technique that can be used involves the use of ultrasonic energy, e.g., wherein the liquid is atomized by the ultrasonic vibrations of a spray forming tip and thereby changed to a spray, such as in U.S. Pat. No. 5,582,348 to Erickson et al., which is incorporated herein by reference.

Still another method of spray coating that can be used is electrostatic spray coating in which a charge is conveyed to the fluid or droplets to increase the efficiency of coating, one example of which is disclosed in U.S. Pat. No. 4,993,645 to Buschor, which is incorporated herein by reference. Yet another method of atomizing liquid for spray coating involves purely mechanical energy, e.g. via contacting the liquid with a high speed reciprocating member or a high speed rotating disk, such as disclosed in U.S. Pat. No. 4,923,123 to Rutz et al., which is incorporated herein by reference.

In addition to the above methods, still another example of a spray coating technique that can be used involves the use of piezoelectric elements to atomize the liquid. Examples of such spray coating techniques and devices employing piezoelectric elements are disclosed in U.S. Pat. Nos. 5,530,465; 5,630,793; and 5,624,608, which are incorporated herein by reference.

The techniques described above, as well as other spray techniques, can, in some embodiments, be used with air assistance or elevated solution pressure. Moreover, a combination of two or more techniques may prove more useful with some materials and conditions.

In one embodiment, the spraying technique involves dispensing a polyanion or polycation solution using a metering pump to an ultrasonic dispensing head. The polyionic layer is sprayed so as to allow the surface droplets to coalesce across the surface of the material. The "layer" may then be allowed to interact for a period of time or immediately rinsed with water or a saline solution (or other solution devoid of polyanion or polycation). The dispensing head or nozzle can be positioned between about 9 mm to about 25 mm from the mold being sprayed. Moreover, a drying pressure between about 20 psi to about 40 psi can be provided.

It should be understood that a person of ordinary skill in the art would be able to select a spray coating method described above or any other well known spray coating method to apply polyionic materials to a mold in accordance with the present invention. As such, a process of the present invention is not limited to a particular application method or spray technique.

Similar to the embodiments described above, polyionic materials can also be applied to a mold in accordance with the present invention using multi-step dipping techniques. For example, in one embodiment, LbL, consecutive dipping techniques can be used to coat a mold of the present invention with polyionic materials. One such LbL dipping process is disclosed in U.S. patent application Ser. No. 09/199,609. In one embodiment of such a LbL dipping process, a mold is dipped into a polyanionic solution (PAA), rinsed with water, sprayed with a polycationic solution (PAH), rinsed with water, sprayed with a polyanionic solution (PAA), etc., until the desired coating thickness is applied to the mold.

In still other embodiments, the mold can be coated with polyionic materials in accordance with the present invention using the single-dip process disclosed in U.S. patent application (filed on the same day as the present application) entitled "Single-Dip Process for Achieving a LbL-Like Coating". When such a process is utilized in accordance with the present invention, it is typically desired that the mold be initially pre-conditioned so as to ease in formation of a polyionic coating thereon. To sufficiently maintain optical geometry of the mold, the mold is typically not swollen, but instead primed with one or more layers of polyionic material using a LbL coating process.

In addition to the above-mentioned processes for applying a coating to a mold, any other process known in the art to be suitable for the application of polyionic material to a substrate can be utilized in the present invention. Moreover, in some embodiments, combinations of such processes can be utilized to achieve a polyionic coating on a mold. For instance, in one embodiment, the mold is first sprayed with a polyanionic solution (PAA) for 1.5 seconds, rinsed with water for 3 seconds, sprayed with a polycationic solution (PEI) for 1.5 seconds, rinsed with water for 3 seconds, sprayed with a polyanionic solution (PAA) for 1.5 seconds, rinsed with water for 3 seconds, sprayed with a polycationic solution (PAH) for 1.5 seconds, etc. until a certain coating thickness has been applied to the mold. Thereafter, the mold is dipped into a polyanionic solution for about 5 minutes, rinsed with water for 1 minute, dipped in a polycationic solution for 5 minutes, rinsed with water for 1 minute, etc. until a sufficient coating is achieved. Such a combination of deposition techniques can, in some instances, improve uniformity and/or reduce water consumption.

Moreover, in other embodiments of the present invention, polyionic materials can be applied after formation of the lens, i.e. casting, curing, and extracting as described in more detail below. Thus, in accordance with the present invention, polyionic materials can be applied to a mold before forming the lens or to a lens after it is formed in a mold, or both. For example, in one embodiment, such as the multi-step dipping embodiment described above, the formed contact lens can be further dipped in a polyanionic solution for about 2 to about 5 minutes and then washed with water and packaged. In another embodiment, the formed contact lens can be dipped in a polyanionic solution for 5 minutes, rinsed with water for 2 minutes, dipped in a polycationic solution for 5 minutes, rinsed with water for 2 minutes, etc. until the desired coating is formed.

As stated above, various techniques can be utilized to apply a coating onto a mold in accordance with the present invention. Moreover, it is not generally necessary that the entire mold be applied with the same or with any polyionic material. For example, in one embodiment, one solution of polyionic material is applied to one section of the mold, while another solution of polyionic material is applied to the other section of the mold such that an asymmetric coating can result. Moreover, if other additives are applied to a mold according to the present invention, it may often be desired to only partially cover the mold with the additives. For example, in one embodiment, a UV absorber is applied to only one side of the mold such that curing of a lens therein can occur by shining UV light through the other, non-UV coated side.

Although the coating processes described above relate specifically to coating a mold and/or contact lens with polyionic materials, it should be understood that any other additives, such as described above, can be applied utilizing techniques of the present invention. For example, antibacterials, antimicrobials, visibility tinting agents, iris color modifying dyes, ultraviolet (UV) light tinting dyes (such as UV absorbers), and cell growth inhibitors, etc. can all be applied to the mold. In one embodiment, such additives can be applied to one or more solutions of polyionic material and then added to the mold. In another embodiment, such additives are applied to the mold in a separate step from the polyionic materials. For instance, an IRIS pattern for opaque tints or other tints can be sprayed onto a mold. Moreover, peptides, proteins, polyquats, organoselenium compounds, can be separately sprayed or applied to a mold according to the present invention. Besides being applicable to the mold prior to formation of a lens, such additives can also be applied directly to the lens after it is formed. Such "post-treatment" can occur with or without the addition of polyionic materials after forming the lens.

Formation of the Contact Lens

A. Substrate Materials

In accordance with the present invention, once a coating has been applied to the mold, a lens can formed within the mold by injecting a polymerizable substrate material into the mold and curing the material therein. In general, any materials used in the art to form polymeric materials, such as contact lenses, can be used in the present invention. In particular, when forming a contact lens, the substrate material may be an oxygen-permeable material, such as flourine- or siloxane-containing polymer. For example, the polymeric materials described in U.S. Pat. No. 5,760,100 to Nicolson et al. are suitable substrate materials for use in the present invention. For illustrative purposes, other examples of suitable materials are disclosed below, without limitation.

One embodiment of a suitable substrate material of the present invention is a copolymer formed from the following monomeric and macromeric components:

(a) about 5 to about 94 dry weight percent of a macromer having the segment of the formula:

where
PDMS is a divalent poly(disubstituted siloxane),
ALK is an alkylene or alkylenoxy group having at least 3 carbon atoms,
DU is a diurethane-containing group,
PAO is a divalent polyoxyalkylene, and
CP is selected from acrylates and methacrylates, wherein said macromer has a number-average molecular weight of about 2000 to about 10,000;

(b) about 5 to about 60 weight percent methacryloxypropyltris (trimethylsiloxy)silane;

(c) about 1 to about 30 weight percent of an acrylate or methacrylate monomer; and (d) 0 to about 5 weight percent cross-linking agent, with the weight percentages being based upon the dry weight of the polymer components.

Moreover, a particular polysiloxane macromer segment is defined by the formula:

where
PDMS is a divalent poly(disubstituted siloxane);
CP is an isocyanatoalkyl acrylate or methacrylate, preferably isocyanatoethyl methacrylate, where the urethane group is bonded to the terminal carbon on the PAO group;
PAO is a divalent polyoxyalkylene (which may be substituted), and is preferably a polyethylene oxide, i.e., $(-CH_2-CH_2-O-)_m\ CH_2-CH_2-$ where m may range from about 3 to about 44, more preferably about 4 to about 24;
DU is a diurethane (which may be a cyclic structure), where an oxygen of the first urethane linkage is bonded to the PAO group and an oxygen of the second urethane linkage is bonded to the ALK group;
and ALK is an alkylene or alkylenoxy group having at least 3 carbon atoms, such as a branched alkylene group or an alkylenoxy group having 3 to 6 carbon atoms, such as a sec-butyl (i.e., $-CH_2CH_2CH(CH_3)-$) group or an ethoxypropoxy group (e.g., $-O-(CH_2)_2-O-(CH_2)_3-$).

Another embodiment of a suitable substrate material of the present invention is a macromer having the following general formula I:

$$P_1-(Y)_m-(L-X_1)_p-Q-(X_1-L)_p-(Y)_m-P_1$$

where each $P_1$, independently of the others, is a free radical-polymerizable group;

each Y, independently of the others, is —CONHCOO—, —CONHCONH—, —OCONHCO—, —NHCONHCO—, —NHCO—, —CONH—, —NHCONH—, —COO—, —OCO—, —NHCOO— or —OCONH—;

m and p, independently of one another, are 0 or 1;

each L, independently of the others, is a divalent radical of an organic compound having up to 20 carbon atoms;

each $X_1$, independently of the others, is —NHCO—, —CONH—, —NHCONH—, —COO—, —OCO—, —NHCOO— or —OCONH—; and Q is a bivalent polymer fragment consisting of the segments;

(a) —$(E)_k$—Z—$CF_2$—$(OCF_2)_x$—$(OCF_2CF_2)_y$—$OCF_2$—Z—$(E)_k$—, where x+y is a number in the range of about 10 to about 30;

each Z, independently of the others, is a divalent radical having up to about 12 carbon atoms or Z is a bond;

each E, independently of the others, is —$(OCH_2CH_2)_q$—, where q has a value of from 0 to about 2, and where the link —Z—E— represents the sequence —Z—$(OCH_2CH_2)_q$—; and k is 0 or 1;

(b)

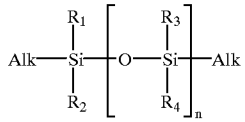

where n is an integer from about 5 to about 100;

Alk is alkylene having up to about 20 carbon atoms;

about 80% to about 100% of the radicals $R_1$, $R_2$, $R_3$ and $R_4$, independently of one another, are alkyl and 0 to about 20% of the radicals $R_1$, $R_2$, $R_3$ and $R_4$, independently of one another, are alkenyl, aryl or cyanolkyl; and (c) $X_2$—R—$X_2$, where R is a divalent organic radical having up to 20 carbon atoms; and each $X_2$, independently of the others, is —NHCO—, —CONH—, —NHCONH—, —COO—, —OCO—, —NHCOO—, or OCONH—;

with the provisos that there is typically at least one of each segment (a), (b), and (c) in Q, that each segment (a) or (b) has a segment (c) attached to it, and that each segment (c) has a segment (a) or (b) attached to it.

The number of segments (b) in the polymer fragment Q may be greater than or equal to the number of segments (a). The ratio between the number of segment (a) and (b) in the polymer fragment Q, for example, may be about 3:4, 2:3, 1:2 or 1:1. The molar ratio between the number of segments (a) and (b) in the polymer fragment Q may be, for example, 2:3, 1:2 or 1:1.

The mean molecular weight of the polymer fragment Q is in the range of about 1,000 to about 20,000, sometimes in the range of about 3,000 to about 15,000, and sometimes in the range of about 5,000 to about 12,000.

The total number of segments (a) and (b) in the polymer fragment Q may be in the range of about 2 to about 11, in the range of about 2 to about 9, or in the range of about 2 to about 7. The smallest polymer unit Q may be composed of one perfluoro segment (a), one siloxane segment (b) and one segment (c).

In still another embodiment of the present invention, the substrate material can be formed by polymerizing macromers that contain free hydroxyl groups. Macromers that are built up, for example, from an amino-alkylated polysiloxane derivatized with at least one polyol component that contains an unsaturated polymerizable side chain may be utilized. In one embodiment, polymers can be prepared from the macromers according to the invention by homopolymerization. The macromers mentioned can also be mixed and polymerized with one or more hydrophilic and/or hydrophobic comonomers. A special property of the macromers according to the invention is that they function as the element which controls microphase separation between selected hydrophilic and hydrophobic components in a cross-linked end product.

The hydrophilic/hydrophobic microphase separation is in the region of less than about 300 nm. The macromers may be cross-linked at the phase boundaries between, for example, an acrylate comonomer on the one hand and an unsaturated polymerizable side chain of polyols bonded to polysiloxane by covalent bonds, and additionally by reversible physical interactions such as hydrogen bridges. These are formed, for example, by numerous amide or urethane groups. The continuous siloxane phase that exists in the phase composite has the effect of producing a high permeability to oxygen.

The polymers of this embodiment can be formed by polymerizing a macromer comprising at least one segment having the following general formula (II):

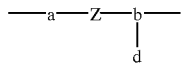

in which, (a) is a polysiloxane segment, (b) is a polyol segment which contains at least 4 carbon atoms, Z is a segment (c) or a group X1, and (c) is defined as $X_2$—R—$X_2$, wherein R is a bivalent radical of an organic compound having up to 20 carbon atoms and each $X_2$ independently of the other is a bivalent radical which contains at least one carbonyl group, $X_1$ is defined as $X_2$, and (d) is a radical having the following general formula (III):

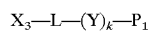

in which, $P_1$ is a group that can be polymerized by free radicals;

Y and $X_3$ independently of one another are a bivalent radical which contains at least one carbonyl group;

k is 0 or 1; and

L is a bond or a divalent radical having up to 20 carbon atoms of an organic compound.

In one embodiment, a polysiloxane segment (a) can be derived from a compound having the following general formula (IV):

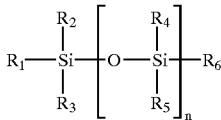

in which, n is an integer from 5 to 500;

25%–99.8% of the radicals $R_1$, $R_2$, $R_3$, $R_4$, $R_5$, and $R_6$ independently of one another are alkyl and 0.2%–75% of the radicals $R_1$, $R_2$, $R_3$, $R_4$, $R_5$, and $R_6$ independently of one another are partly fluorinated alkyl, aminoalkyl, alkenyl, aryl, cyanoalkyl, alk-NH-alk-$NH_2$ or alk-$(OCH_2)_m$—$(OCH_2)_p$—$OR_7$, where $R_7$ is hydrogen or lower alkyl, alk is alkylene, and m and p independently of one another are an integer from 0 to 10, one molecule containing at least one primary amino or hydroxyl group.

The alkylenoxy groups —$(OCH_2CH_2)_m$ and —$(OCH_2)_p$ in the siloxane of the formula (IV) are either distributed randomly in a ligand alk-$(OCH_2CH_2)_m$—$(OCH_2)_p$—$OR_7$ or are distributed as blocks in a chain.

A polysiloxane segment (a) is linked a total of about 1 to about 50 times, and for example, about 2 to about 30 times, and in particular about 4 to about 10 times, via a group Z with a segment (b) or another segment (a), Z in an a-Z-a sequence typically being a segment (c). The linkage site in a segment (a) with a group Z is an amino or hydroxyl group reduced by one hydrogen.

Another embodiment of a substrate material of the present invention involves the polymerization of a siloxane-containing macromer formed from a poly(dialkylsiloxane) dialkoxyalkanol having the following structure:

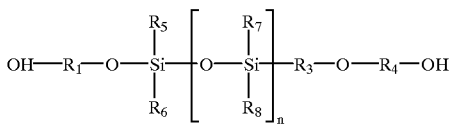

where n is an integer from about 5 to about 500, in some embodiments about 20 to about 200, and in some embodiments about 20 to about 100;

the radicals $R_1$, $R_2$, $R_3$, and $R_4$, independently of one another, are lower alkylene, for example a $C_1$–$C_6$ alkylene, a $C_1$–$C_3$ alkylene, and wherein, in one embodiment, the total number of carbon atoms in $R_1$ and $R_2$ or in $R_3$ and $R_4$ is greater than 4; and $R_5$, $R_6$, $R_7$, and $R_8$ are, independently of one another, lower alkyl, in some embodiments, $C_1$–$C_6$ alkyl, and in some embodiments, a $C_1$–$C_3$ alkyl.

The general structure of the macromer discussed above is as follows:

ACRYLATE-LINK-ALK-O-ALK-PDAS-ALK-O-ALK-LINK-ACRYLATE where the ACRYLATE is selected from acrylates and methacrylates; LINK is selected from urethanes and diurethane linkages, ALK-O-ALK is, as defined above, ($R_1$—O—$R_2$ or $R_3$—O—$R_4$), and PDAS is a poly(dialkylsiloxane).

For example, the macromer described above can be prepared by reacting isophorone diisocyanate, 2-hydroxyethyl (meth)acrylate and a poly(dialkylsiloxane) dialkoxyalkanol in the presence of a catalyst.

B. Curing Process

In general, once a particular substrate material is selected, it can then be dispensed into one of the mold halves in accordance with the present invention. Thereafter, the mold halves can be connected such that the mold cavity becomes enclosed. The substrate material can then be cured, i.e. polymerized, to form a contact lens. One embodiment of such a process is disclosed in U.S. Pat. No. 5,894,002 to Boneberger et al., which is herein incorporated by reference. For illustrative purposes, another embodiment of such a method is discussed in more detail below.

Figure 2:
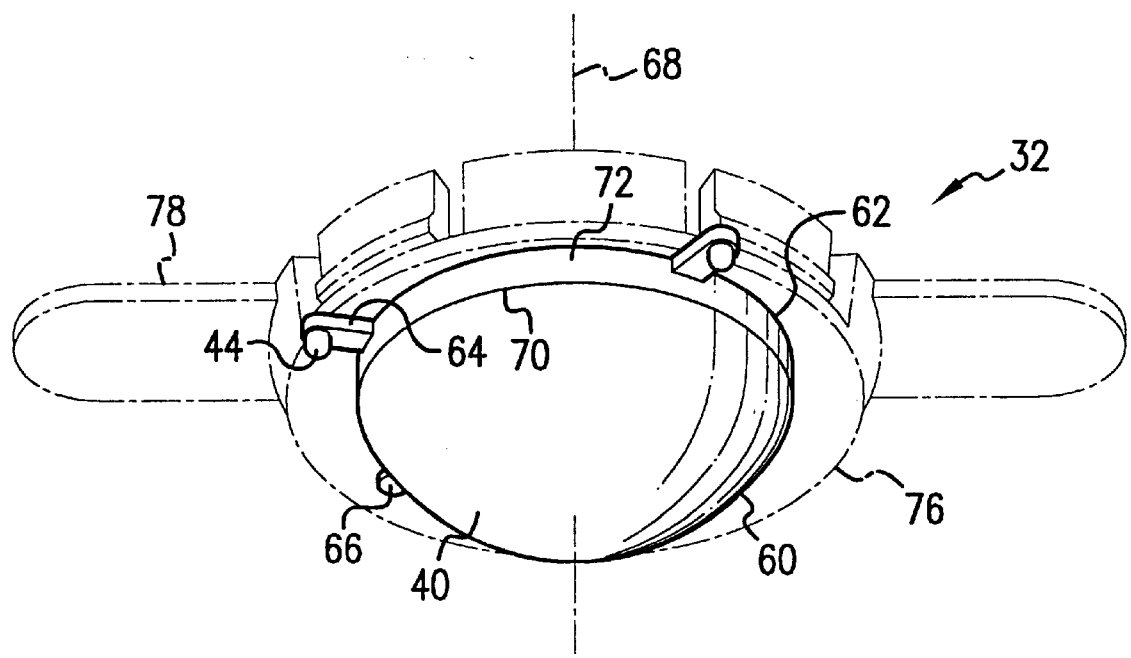
FIG. 2 is a partial perspective view of a base curve mold half as shown in FIG. 1.
Figure 4:
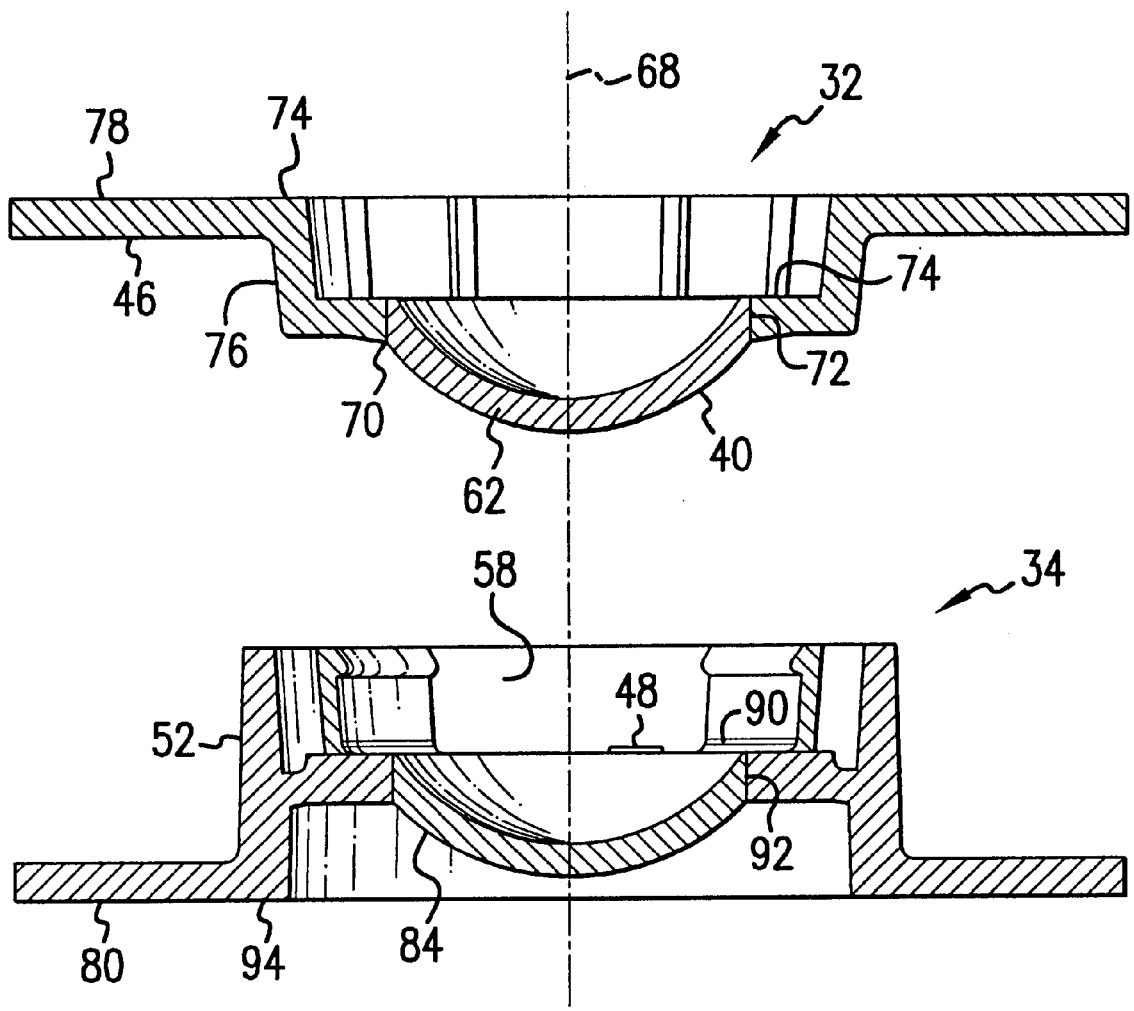
FIG. 4 is a cross-sectional view of the front mold half as shown in FIG. 1 take along the line 7—7.

Referring to FIGS. 3 and 4, mold half 34 includes a first section 82 having a center section 84 defining concave optical surface 42. First section 82 also includes a plurality of tabs 86 from which protrusions 48 extend. As with first section 60 of mold half 32 (FIG. 2), first section 82 includes a tab 88 formed by solidified material between an injection gate and center section 84. Tab 88 may also be referred to as the gate.

Optical surface 42 defines an edge 90 centered about axis 68. Center section 84 defines a boundary 92 parallel to axis 68 and including edge 90. A second section 94 meets and completely surrounds boundary 92.

Referring to FIGS. 1 and 5, when mold halves 32 and 34 are brought together, as indicated by arrow 36, and aligned with respect to each other by protrusions 44 and 48 and by protrusions 56 and collar 52, mold cavity 38 is formed between front side 46 of mold half 32 and front side 50 of mold half 34. Prior to assembly of the mold halves, a substrate material is deposited in concave optical surface 42. When the molds are assembled, convex optical surface 40 engages the substrate so that it fills the portion 96 of mold cavity 38 between the optical surfaces. Excess substrate is pushed radially outward into a second mold cavity portion 98 extending radially outward from a boundary 100 that includes boundaries 92 and 72. Cavity portion 98 includes an annular reservoir 102 to receive the excess monomer. As should be understood by those skilled in this art, while the thickness of center sections 62 and 84 may vary on the order of microns across their respective cross-sections, each defines a generally uniform thickness above and below their respective optical surfaces.

First sections 62 and 84 are formed by a material that passes light used to cure the lens-forming material in mold cavity portion 96. It should be understood that the particular light (e.g. ultraviolet, infrared, visible or other wavelength range) used to cure the lens will depend upon the characteristics of the lens-forming material. Thus, any light suitable to cure the lens should be understood to be within the meaning of "curing light" as used herein. Accordingly, while the mold as described herein is used in an ultraviolet light system, it should be understood that this is for exemplary purposes only and that molds within the scope of the present invention may be formed with respect to light in other wavelengths.

To aid in polymerization during coating, nitrogen gas can, in some embodiments, be applied to the mold prior to dispensing a polymerizable substrate material therein. In particular, nitrogen gas can act to "blanket" the mold so as to rid the mold of some radical scavengers present on the mold surface. Radical scavengers can sometimes inhibit the polymerization of the substrate material. However, although the removal of such radical scavengers often aids in the curing process, it is certainly not necessary in the present invention to cure a polymerizable material dispensed within the mold.

In accordance with the present invention, it has been discovered that, during curing, a coating previously applied to the mold can detach from the mold. After detaching from the mold, the coating can at least partially attach itself to the exterior surface of the contact lens formed within the mold such that the surface of the lens is sufficiently altered. As a result, the contact lens can be easily removed from the mold without being destructively torn. Moreover, the coating on a contact lens removed from the mold can still sufficiently alter the surface properties of the substrate material as in other conventional processes.

In some embodiments, it may be desired to apply secondary coatings onto a formed contact lens. When such secondary coatings are utilized, the coatings can be applied using any coating process described above, other well known coating processes, or any combination thereof. For example, a contact lens formed within a mold can be dipped into one or more polyionic solutions after it is cured. When such secondary coatings are desired, the formed contact lens can be "pre-conditioned" such that the surface of the lens can be roughened to ease in the application of the polyionic materials thereon. In this regard, the roughness of the substrate surface can be altered in a variety of ways. Generally, an "underlayer" or "primer layer" of a coating solution can be initially applied to the substrate material to accomplish the desired surface alteration. For example, in one embodiment, one or more standard layer-by-layer dip coatings can be employed as an underlayer for the ultimate dip coating of the present invention. In some embodiments, the underlayer can be made from a polyionic material, such as poly(ethyleneimine). After applying this primer coating or underlayer, in one embodiment, the contact lens can then be dipped into the ultimate coating solution.

Moreover, in another embodiment, the substrate material can be allowed to swell in a solvent solution comprising a solvent and at least one polyionic material. In general, any solvent that can allow the components within the coating solution to remain stable in water is suitable for use in the present invention. Examples of suitable alcohols can include, but are not limited to, isopropyl alcohol, hexanol, ethanol, etc. In certain embodiments, the substrate material is first allowed to swell in an isopropyl alcohol solution containing about 20% isopropyl alcohol and about 80% water.

After swelling, the substrate material can then be removed from the solvent solution and allowed to "shrink". This "shrinking" step causes the substrate material to entrap the initial layer of the polycation or polyanion. The swelling/entrapment process described in this embodiment can enhance the ability of the coating solution to coat the substrate material.

Once the desired coating is applied to a contact lens, the coating can, in some embodiments, be cross-linked to make the surface even more resistant to wear or abrasion, as well as more durable. The coating can generally be cross-linked by any method known in the art. For example, in one embodiment, a crosslinking agent can be sprayed onto the coating and, thereafter, radiation with visible light can then be applied such that the coating becomes cross-linked. Suitable crosslinking agents can include, for example, active moieties such as carbenes, nitrenes, and the like.

The present invention may be better understood by reference to the following examples. Examples 1–4 generally illustrate processes for directly coating a contact lens, and Examples 5–7 generally illustrate a process for transfer grafting a coating from a mold to a substrate in accordance with the present invention.

EXAMPLE 1

The ability of polyionic materials to be coated onto a contact lens using layer-by-layer dipping was demonstrated. The substrate material (i.e. contact lens) was prepared with materials such as described in U.S. Pat. No. 5,760,100 to Nicolson et al.

A sample contact lens was initially coated with a primer layer by dipping the lens into a PEI solution for 5 minutes. The PEI solution was prepared by dissolving PEI powder in water such that a 0.001M PEI solution resulted. After dipping, the lens was rinsed for 2 minutes in consecutive rinse baths. Once the above steps were completed, the lens was then dipped into a PAA solution for 5 minutes, rinsed for 2 minutes, rinsed for 2 minutes, dipped into a PAH solution for 5 minutes, rinsed for 2 minutes, rinsed for 2 minutes, dipped into a PAA solution for 5 minutes, etc., until 10 bilayers of polyionic material were formed onto the lens. The PAA and PAH solutions were prepared by dissolving the respective powders in water to form 0.001M solutions. It was determined that 20 dipping steps, taking 180 minutes, were required to form a 100 to 200 angstrom coating.

EXAMPLE 2

The ability of polyionic materials to be coated onto a contact lens using layer-by-layer dipping and air drying was demonstrated. The substrate material (i.e. contact lens) was prepared with materials, such as described in U.S. Pat. No. 5,760,100 to Nicolson et al.

A sample contact lens was initially coated with a primer layer by dipping the lens into a PEI solution for 5 minutes. The PEI solution was prepared by as described in Example 1. After dipping, the lens was dried for 1 minute with an air knife. Once the above steps were completed, the lens was then dipped into a PAA solution for 5 minutes, dried with an air knife for 1 minute, dipped into a PAH solution for 5 minutes, dried for 1 minute, dipped into a PAA solution for 5 minutes, etc., until 10 bilayers of polyionic material were formed onto the lens. The PM and PAH solutions were prepared as described in Example 1.

It was determined that 20 dipping steps, taking 120 minutes, were required to form a 100 to 200 angstrom coating.

EXAMPLE 3

The ability of polyionic materials to be coated onto a contact lens using layer-by-layer spraying and air drying was demonstrated. The substrate material (i.e. contact lens) was prepared with materials, such as described in U.S. Pat. No. 5,760,100 to Nicolson et al.

A sample contact lens was initially coated with a primer layer by spraying a PEI solution onto the lens for 1 minute using an ultrasonic nozzle. The PEI solution was prepared as described in Example 1. After spraying, the lens was dried for 1 minute with an air knife. Once the above steps were completed, the lens was again sprayed with a PAA solution for 1 minute, dried for 1 minute, sprayed with a PAH solution for 1 minute, dried for 1 minute, sprayed with a PAA solution for 1 minute, etc., until 10 bilayers of polyionic material were formed onto the lens. The PAA and PAH solutions were prepared as described in Example 1.

It was determined that 20 spray steps, taking 40 minutes, were required to form a 200 to 300 angstrom coating.

EXAMPLE 4

The ability of polyionic materials to be coated onto a contact lens in a relatively short amount of time using a solution of the present invention was demonstrated. The substrate material (i.e. contact lens) was prepared with materials, such as described in U.S. Pat. No. 5,760,100 to Nicolson et al.

A sample contact lens was coated using single dip solutions of the present invention. In particular, the lens was coated as follows. Initially, a primer layer was applied to the lens by spraying a PEI solution onto the lens for 1 minute (using an ultrasonic nozzle), drying the lens for 1 minute (using an air knife), spraying with a PAA solution for 1 minute, drying for 1 minute, spraying with a PEI solution for 1 minute, drying for 1 minute, spraying with a PAA solution for 1 minute, and drying for 1 minute. The PEI and PAA solutions were prepared as described in Example 1. After applying the primer coating, the lens was dipped in a predominantly polyanionic single-dip solution for 1 minute, dried for 1 minute, dipped into a predominantly polycationic single-dip solution for 1 minute, and dried for 1 minute such that a 10 bilayer coating was formed. The single-dip solutions used above were formed as follows. A solution of polyacrylic acid having a molecular weight of about 90,000 was prepared by dissolving a suitable amount of the material in water to form a 0.001M PAA solution. Once dissolved, the pH of the polyanionic solution was adjusted by adding 1N hydrochloric acid until the pH reached 2.5. After preparing the above solution, poly(allylamine hydrochloride) having a molecular weight of about 50,000 to about 65,000 was dissolved in water to form a 0.001M solution. Thereafter, the pH was similarly adjusted by adding hydrochloric acid until a pH of 2.5 was obtained.

A portion of the solutions was then mixed to form the predominantly polyanionic single-dip coating solution. Specifically, a single-dip solution having a 10:1 molar charge ratio (polyanion:polycation) was formed by adding 1 part (by volume) of the PAH solution into 10 parts (by volume) of the PAA solution. The predominantly polycationic single-dip solution was similarly formed into a solution having a 1:10 molar charge ratio (polyanion:polycation) by adding 1 part (by volume) of the PAA solution into 10 parts (by volume) of the PAH solution.

It was determined that only 4 spray steps (primer layer) and 2 dips, taking only 12 minutes, were needed to form about a 1 micron coating on the lens. As can be seen from the results of the example, a single-dip solution of the present invention can allow the coating of substrate materials in faster times than standard layer by layer processes.

EXAMPLE 5

The ability of polyionic materials to be first coated onto a mold so that a contact lens can be formed within the mold and the coating can transfer from the mold to the contact lens was demonstrated. The substrate material (i.e. contact lens) was prepared with materials, such as described in U.S. Pat. No. 5,760,100 to Nicolson et al. and the molds were made by cast molding techniques, such as described herein.

A sample mold was initially coated with a primer layer by spraying a PAA solution onto the mold for 1.5 seconds using an ultrasonic nozzle. The PAA solution was prepared as described in Example 1. After spraying, the mold was sprayed with water for 3 seconds. Thereafter, the mold was sprayed with a PEI solution for 1.5 seconds followed with water for 3 seconds. The PEI solution was prepared as described in Example 1. The mold was again sprayed with the PAA solution for 1.5 seconds and water for 3 seconds. A PAH solution was then sprayed onto the mold for 1.5 seconds, followed by a water spray for 3 seconds. The PAH solution was prepared as described in Example 1. Once the above steps were completed, the mold was again sprayed with a PAA solution for 1 minute, sprayed with water for 3 seconds, sprayed with a PAH solution for 1.5 seconds, sprayed with water for 3 seconds, sprayed with a PAA solution for 1.5 seconds, sprayed with water for 3 seconds, sprayed with a PAH solution for 1.5 seconds, sprayed with water for 3 seconds, sprayed with a PAA solution for 1.5 seconds, sprayed with water for 3 seconds, sprayed with PAH for 1.5 seconds, sprayed with water for 3 seconds, etc., until 5 bilayers of polyionic material were formed onto the mold.

Once the molds were coated, a polymeric substrate material, such as disclosed herein, was then dispensed into the mold. Thereafter, the polymeric substrate material was cast, cured, and extracted through isopropyl alcohol extraction as is well known in the art. After being removed, the sample lens was dipped into a predominantly polyanionic single-dip solution for 2 to 5 minutes.

The single-dip solution used above was formed as follows. A solution of polyacrylic acid having a molecular weight of about 90,000 was prepared by dissolving a suitable amount of the material in water to form a 0.001M PAA solution. Once dissolved, the pH of the polyanionic solution was adjusted by adding 1N hydrochloric acid until the pH reached 2.5. After preparing the above solution, poly (allylamine hydrochloride) having a molecular weight of about 50,000 to about 65,000 was dissolved in water to form a 0.001M solution. Thereafter, the pH was similarly adjusted by adding hydrochloric acid until a pH of 2.5 was obtained. A portion of the solutions were then mixed to form the predominantly polyanionic single-dip coating solution. Specifically, a single-dip solution having a 10:1 molar charge ratio (polyanion:polycation) was formed by adding 1 part (by volume) of the PAH solution into 10 parts (by volume) of the PAA solution.

It was determined that a 5 bilayer coating was achieved with a spray time of 1.5 minutes and a dip time of 2 to 5 minutes to form a 200 to 400 angstrom coating. Moreover, it was also determined that essentially the entire coating transferred to the solidified article.

EXAMPLE 6

The ability of polyionic materials to be transferred from a mold to a contact lens formed within the mold was demonstrated. The substrate material (i.e. contact lens) was prepared with materials, such as described in U.S. Pat. No. 5,760,100 to Nicolson et al. and the molds were made by cast molding techniques, such as described herein.

A sample mold was initially coated with a primer layer by spraying a PAA solution onto the mold for 1.5 seconds using an ultrasonic nozzle. The PM solution was prepared as described in Example 1. After spraying, the mold was sprayed with water for 3 seconds. Thereafter, the mold was sprayed with a PEI solution for 1.5 seconds followed with water for 3 seconds. The PEI solution was prepared as described in Example 1. The mold was again sprayed with the PM solution for 1.5 seconds and water for 3 seconds. A PAH solution was then sprayed onto the mold for 1.5 seconds, followed by a water spray for 3 seconds. The PAH solution was prepared by as described in Example 1.

Once the above steps were completed, the mold was dipped into a predominantly polyanionic single-dip solution for 5 minutes, rinsed with water for 1 minute, dipped into a predominantly polycationic single dip solution for 1 minute, and rinsed with water for 1 minute. After applying the coating to the mold, a polymeric substrate material was dispensed into the mold, cured, and extracted as described in Example 5. Thereafter, the finished contact lens was dipped into a predominantly polyanionic single dip solution for 2 to 5 minutes.

The single-dip solutions used above were formed as follows. A solution of polyacrylic acid having a molecular weight of about 90,000 was prepared by dissolving a suitable amount of the material in water to form a 0.001M PAA solution. Once dissolved, the pH of the polyanionic solution was adjusted by adding 1N hydrochloric acid until the pH reached 2.5. After preparing the above solution, poly (allylamine hydrochloride) having a molecular weight of about 50,000 to about 65,000 was dissolved in water to form a 0.001M solution. Thereafter, the pH was similarly adjusted by adding hydrochloric acid until a pH of 2.5 was obtained.

A portion of the solutions were then mixed to form the predominantly polyanionic single-dip coating solution. Specifically, a single-dip solution having a 10:1 molar charge ratio (polyanion:polycation) was formed by adding 1 part (by volume) of the PAH solution into 10 parts (by volume) of the PAA solution. The predominantly polycationic single-dip solution was similarly formed into a solution having a 1:10 molar charge ratio (polyanion:polycation) by adding 1 part (by volume) of the PAA solution into 10 parts (by volume) of the PAH solution.

It was determined that a 5 bilayer coating having a thickness of approximately 1 micron could be formed in 13 minutes for each lens.

EXAMPLE 7

The ability of polyionic materials to be deposited onto a contact lens mold was demonstrated. Various contact lenses were coated using three coating methods. For each lot below, the substrate material (i.e. contact lens) was prepared with materials, such as described in U.S. Pat. No. 5,760,100 to Nicolson et al. and the molds were made by cast molding techniques, such as described herein.

Dip coated lenses (Lot #1): The first lot of contact lenses was prepared by dipping the lenses into the polyionic materials. Initially, the contact lenses were swelled in an isopropyl alcohol solution. After sufficient swelling, the lenses were then dipped into a 0.001M solution (Solution A) that contained poly(allylamine hydrochloride) having a MW of about 60,000 and polyacrylic acid having a MW of about 90,000 at a 10:1 molar charge ratio (polyanion/polycation) and a pH of 2.5. The lenses remained in the solution for 5 minutes and were thereafter rinsed with water for approximately 1 minute. After dipping the lenses into Solution A and rinsing, the lenses were dipped into a second 0.001M solution (Solution B) that contained the same polyionic materials and pH, but having a molar charge ratio of 1:10 (polyanion/polycation). The lenses remained in this solution for 5 minutes. After dipping, the lenses were rinsed for about 1 minute with water.

Spray coated molds (Lot #2): The second lot of contact lenses was prepared by spraying molds with polyionic materials prior to forming the lenses. The molds were sprayed with a 0.001M solution that contained poly (ethyleneimine) for about 1 minute using an ultrasonic nozzle. Thereafter, the lenses were rinsed and sprayed with a 0.001M solution of polyacrylic acid for about 1 minute. These steps were repeated into 3 bilayers were formed onto the mold. After applying the sprayed coating, the lens materials were dispensed into the molds and cured. The lenses were then extracted with isopropyl alcohol.

Dip coated molds (Lot #3): The third lot of contact lenses was prepared by dipping the sprayed molds above into other solutions of polyionic materials. After being sprayed, the molds were dipped into Solution A for about 5 minutes, rinsed in water for about 1 minute, dipped into Solution B for about 5 minutes, and rinsed again in water for about 1 minute. After dipping, the lens materials were dispensed into the molds and cured. The lenses were then extracted with isopropyl alcohol, dipped into Solution A for about 5 minutes, and then dipped into Solution B for about 5 minutes.

Control: For each lot of lenses made according to the three sets of conditions given above, a plasma treated lens was also prepared as a control. One such technique for forming a plasma treated lens is described in PCT Publication No. WO 96/31792 to Nicolson et al.

After the lenses were prepared, they were tested on 30 subjects by placing one of the lenses from Lots 1, 2, or 3 in one eye for 6 hours and placing a plasma coated lens (control) in the other eye for 6 hours. After the 6-hour period, the results shown in Table 1 were obtained.

TABLE 1

Comparison of Surface Properties of the Lenses

| Lot | IP | DK | Contact Angle | NISDT (sec) (Plasma Control) | Comfort (Plasma Control) |
|---|---|---|---|---|---|
| 1 | 1.27 | 112 | 61 | 6.7 (8.0) | 78 (72) |
| 2 | 1.41 | 94 | 74 | 5.9 (6.6) | 89 (86) |
| 3 | 1.32 | 107.5 | 63 | 5.0 (6.6) | 77 (78) |

The IP values listed measure the ion permeability of a particular contact lens when contacted with salt ions and water. In other words, the IP value measures the ability of ions to diffuse through the contact lens. This test is more specifically described in U.S. Pat. No. 5,760,100 to Nicolson et al. The Dk value is generally a measure of the ability of a gas, such as oxygen, to diffuse through a contact lens. A more detailed description of the Dk value can also be obtained by reference to U.S. Pat. No. 5,760,100 to Nicolson et al.

In addition to the above parameters, the average contact angles (Sessle Drop) were also measured using a VCA 2500 XE contact angle measurement device from AST, Inc., located in Boston, Mass. The contact angles generally measure the hydrophilicity of a contact lens. In particular, a low contact angle corresponds to a more hydrophilic surface. Furthermore, as indicated above, the NISDT, or non-invasive surface drying time, was also determined. The NISDT is a measure of the "break up time" of a particular contact lens. In particular, each contact lens was visually observed while being worn via a slit lamp, a commonly used measuring device. The NISDT was determined at the point the first disruption of the tear film was observed. Subjective results were also determined from the test subjects as to the comfort of each lens.

As can be seen from Table 1, no significant differences existed in NISDT between the plasma treated lenses and the lenses of lots 1,2, and 3. Moreover, no significant differences existed in subjective comfort. The remaining parameters for the three lots were substantially comparable to each other.

Although various embodiments of the invention have been described using specific terms, devices, and methods, such description is for illustrative purposes only. The words used are words of description rather than of limitation. It is to be understood that changes and variations may be made by those of ordinary skill in the art without departing from the spirit or scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. A method of forming a contact lens, comprising the steps of:
   forming a lens mold having a first mold portion defining a first optical surface and a second mold portion defining a second optical surface, wherein said first mold portion and said second mold portion are configured to receive each other such that a lens forming cavity is formed between said first optical surface and said second optical surface;
   applying a polyanionic material and a polycationic material to at least one of said optical surfaces to form a polyionic bilayer on said optical surface;
   positioning said first mold portion and said second mold portion such that said mold portions receive each other and said optical surfaces define said lens forming cavity;
   dispensing a polymerizable substrate material into said lens forming cavity; and
   curing said polymerizable substrate material within said lens forming cavity such that a contact lens is formed, whereby at least a portion of said polyionic bilayer detaches from said at least one optical surface of said mold portion and reattaches to said formed contact lens such that said contact lens becomes coated with said portion of said polyionic bilayer.

2. A method as defined in claim 1, further comprising the step of removing said contact lens from said lens forming cavity.

3. A method as defined in claim 1, wherein one of said mold portions is formed from a thermoplastic material.

4. A method as defined in claim 3, wherein said thermoplastic material is an ultraviolet light transmissive material.

5. A method as defined in claim 3, wherein said thermoplastic material is an ultraviolet light opaque material.

6. A method as defined in claim 1, wherein said polycationic material comprises poly(allylamine hydrochloride).

7. A method as defined in claim 1, wherein said polycationic material comprises poly(ethyleneimine).

8. A method as defined in claim 1, wherein said polyanionic material comprises polyacrylic acid.

9. A method as defined in claim 1, further comprising the step of applying an additive to said at least one optical surface.

10. A method as defined in claim 9, wherein said additive comprises an antimicrobial.

11. A method as defined in claim 9, wherein said additive comprises an antibacterial.

12. A method as defined in claim 9, wherein said additive comprises an ultraviolet absorbing material.

13. A method as defined in claim 1, wherein said polyanionic material and said polycationic material are separately sprayed onto said at least one optical surface to form said polyionic bilayer.

14. A method as defined in claim 13, wherein said polyionic materials are sprayed onto said at least one optical surface with an ultrasonic dispensing head.

15. A method as defined in claim 1, wherein said polyanionic material and said polycationic material are applied to said at least one optical surface by dipping said at least one mold portion into a solution of said polyanionic material and a solution of said polycationic material.

16. A method as defined in claim 1, wherein said polyanionic material and said polycationic material are applied to said at least one optical surface by dipping said at least one mold portion into a solution that comprises said polyanionic material and said polycationic material.

17. A method as defined in claim 16, wherein said at least one mold portion is preconditioned with a primer coating, said primer coating being applied to said mold by dipping said mold into a solution containing a primer material.

18. A method as defined in claim 1, wherein said substrate material comprises an oxygen-permeable material.

19. A method as defined in claim 1, further comprising the step of applying a secondary coating onto said cured contact lens.

20. A method as defined in claim 19, wherein said secondary coating comprises a polyanionic material and a polycationic material.

21. A method as defined in claim 19, wherein said secondary coating comprises an additive.

22. A method as defined in claim 21, wherein said additive comprises an antimicrobial.

23. A method as defined in claim 21, wherein said additive comprises an antibacterial.

24. A method as defined in claim 21, wherein said additive comprises an ultraviolet absorbing material.

25. A method as defined in claim 19 wherein said secondary coating is applied by separately spraying a polyanionic material and a polycationic material onto said contact lens.

26. A method as defined in claim 19, wherein said secondary coating is applied by dipping said contact lens into a solution of a polyanionic material and a solution of a polycationic material.

27. A method as defined in claim 19, wherein said secondary coating is applied by dipping said contact lens into a solution comprising a polyanionic material and a polycationic material.

28. A method as defined in claim 27, wherein said contact lens is preconditioned prior to the application of said secondary coating.

29. A method as defined in claim 28, wherein said contact lens is preconditioned with a primer coating, said primer coating being applied to said contact lens by dipping said contact lens into a solution containing a primer material.

30. A method as defined in claim 1, further comprising the step of crosslinking said coated contact lens by applying a crosslinking agent to said coated contact lens and thereafter applying radiation to said contact lens.

31. A method as defined in claim 30, wherein said crosslinking agent comprises a carbene.

32. A method as defined in claim 30, wherein said crosslinking agent comprises a nitrene.

33. A method as defined in claim 1, wherein a first polycationic material and a first polyanionic material are applied to one of said optical surfaces and a second polycationic material and a second polyanionic material are applied to the other of said optical surfaces.

34. A method as defined in claim 1, wherein said polyanionic material and said polycationic material are applied to both of said optical surfaces.

35. A method as defined in claim 33, wherein said contact lens is preconditioned by the steps of:
   providing a solvent solution comprising a solvent and at least one polyionic material;
   allowing said contact lens to swell in said solvent solution;
   removing said contact lens from said solvent solution after said polymeric material sufficiently swells therein; and allowing said contact lens to shrink such that said at least one polyionic material becomes entrapped within said contact lens.

36. A method of forming a contact lens, comprising the steps of:
   forming a lens mold having a first mold portion defining a first optical surface and a second mold portion defining a second optical surface, wherein said first mold portion and said second mold portion are configured to receive each other such that a lens forming cavity is capable of forming between said first optical surface and said second optical surface;
   spraying a first polyionic material having a predetermined charge onto at least one of said optical surfaces,
   spraying a second polyionic material having an opposite charge of said first polyionic material onto said at least one of said surfaces such that a polyionic bilayer is formed thereon;
   positioning said first mold portion and said second mold portion such that said mold portions receive each other and said optical surfaces define said lens forming cavity;
   dispensing a polymerizable substrate material into said lens forming cavity; and
   curing said polymerizable substrate material within said lens forming cavity such that a contact lens is formed, whereby at least a portion of said polyionic bilayer detaches from said at least one optical surface of said mold portion and reattaches to said formed contact lens such that said contact lens becomes coated with said portion of said polyionic bilayer.

37. A method as defined in claim 36, further comprising the step of applying an additive to said at least one optical surface.

38. A method as defined in claim 36, further comprising the step of applying a secondary coating of a polyionic material onto said cured contact lens.

39. A method as defined in claim 38, wherein said secondary coating is applied by separately spraying said polyionic material onto said contact lens.

40. A method as defined in claim 38, wherein said secondary coating is applied by dipping said contact lens into a solution containing said polyionic material.

41. A method of forming a contact lens, comprising the steps of:
   forming a lens mold having a first mold portion defining a first optical surface and a second mold portion defining a second optical surface, wherein said first mold portion and said second mold portion are configured to receive each other such that a lens forming cavity is capable of forming between said first optical surface and said second optical surface;
   dipping at least one of said mold portions into a first polyionic material having a predetermined charge;
   dipping said at least one mold portion into a second polyionic material having an opposite charge of said first polyionic material such that a polyionic bilayer is formed on said at least one mold portion;
   positioning said first mold portion and said second mold portion such that said mold portions receive each other and said optical surfaces define said lens forming cavity;
   dispensing a polymerizable substrate material into said lens forming cavity; and
   curing said polymerizable substrate material within said lens forming cavity such that a contact lens material is formed, whereby at least a portion of said polyionic bilayer detaches from said at least one optical surface of said mold portion and reattaches to said formed contact lens such that said contact lens becomes coated with said portion of said polyionic bilayer.

42. A method as defined in claim 41, further comprising the step of applying an additive to said at least one optical surface.

43. A method as defined in claim 41, further comprising the step of applying a secondary coating of a polyionic material onto said cured contact lens.

44. A method as defined in claim 42, wherein said secondary coating is applied by separately spraying said polyionic material onto said contact lens.

45. A method as defined in claim 42, wherein said secondary coating is applied by dipping said contact lens into a solution containing said polyionic material.

46. A method of forming a contact lens, comprising the steps of:
   forming a lens mold having a first mold portion defining a first optical surface and a second mold portion defining a second optical surface, wherein said first mold portion and said second mold portion are configured to receive each other such that a lens forming cavity is capable of forming between said first optical surface and said second optical surface;
   dipping at least one of said mold portions into a solution containing a polyanionic material and a polycationic material such that a polyionic bilayer is formed on said at least one mold portion;
   positioning said first mold portion and said second mold portion such that said mold portions receive each other and said optical surfaces define said lens forming cavity;
   dispensing a polymerizable substrate material into said lens forming cavity; and
   curing said polymerizable substrate material within said lens forming cavity such that a contact lens is formed, whereby at least a portion of said polyionic bilayer detaches from said at least one optical surface of said mold portion and reattaches to said formed contact lens such that said contact lens becomes coated with said portion of said polyionic bilayer.

47. A method as defined in claim 46, further comprising the step of applying an additive to said at least one optical surface.

48. A method as defined in claim 46, further comprising the step of applying a secondary coating of a polyionic material onto said cured contact lens.

49. A method as defined in claim 47, wherein said secondary coating is applied by separately spraying said polyionic material onto said contact lens.

50. A method as defined in claim 47, wherein said secondary coating is applied by dipping said contact lens into a solution containing said polyionic material.

51. A method of forming a polymeric article, comprising the steps of:
   forming a mold having a first mold portion defining a first surface and a second mold portion defining a second surface, wherein said first mold portion and said second mold portion are configured to receive each other such that a cavity is formed between said first surface and said second surface;
   applying a polyanionic material and a polycationic material to at least one of said surfaces to form a polyionic bilayer on said surface;

positioning said first mold portion and said second mold portion such that said mold portions receive each other and said surfaces define said cavity;

dispensing a polymerizable substrate material into said cavity; and curing said polymerizable substrate material within said cavity such that a polymeric article is formed, whereby at least a portion of said polyionic bilayer detaches from said at least one surface of said mold portion and reattaches to said formed polymeric article such that said polymeric article becomes coated with said portion of said polyionic bilayer.

* * * * *